United States Patent [19]

Hibbs et al.

[11] Patent Number: 5,810,284

[45] Date of Patent: Sep. 22, 1998

[54] AIRCRAFT

[76] Inventors: Bart D. Hibbs, 1732 N. Grand Oaks; Peter B. S. Lissaman, 3276 Rubio Canyon Rd., both of Altadena, Calif. 91001; Walter R. Morgan, 3217 Amarillo Ave., Simi Valley, Calif. 93063; Robert L. Radkey, 70 Eddystone Ct., Redwood City, Calif. 94065

[21] Appl. No.: 404,540

[22] Filed: Mar. 15, 1995

[51] Int. Cl.$^6$ .................................................... B64C 39/10

[52] U.S. Cl. ........................... 244/13; 244/45 R; 244/91; 244/62; 244/58; 244/36; 455/431

[58] Field of Search .............................. 244/13, 15, 51, 244/52, 62, 53 R, 124, 199, 91, 58, 36, 137.1, 45 R; 455/11.1, 431; 136/291, 292, 245, 246

[56] References Cited

U.S. PATENT DOCUMENTS

| | | | |
|---|---|---|---|
| 2,433,641 | 12/1947 | Young | 244/51 |
| 2,496,087 | 1/1950 | Fleming | 244/124 |
| 2,626,348 | 1/1953 | Nobles | 455/11.1 |
| 3,937,424 | 2/1976 | Meier et al. | 244/53 R |
| 4,036,455 | 7/1977 | Whitener | 244/137.1 |
| 4,341,607 | 7/1982 | Tison | 244/53 R |
| 4,415,133 | 11/1983 | Phillips | 244/53 R |
| 4,674,709 | 6/1987 | Welles | 244/45 R |
| 4,697,761 | 10/1987 | Long | 244/53 R |
| 4,768,738 | 9/1988 | Weinert | 244/58 |
| 5,086,992 | 2/1992 | Gosen et al. | 244/36 |
| 5,374,010 | 12/1994 | Stone et al. | 244/12.5 |
| 5,518,205 | 5/1996 | Wurst et al. | 244/62 |

FOREIGN PATENT DOCUMENTS

| | | | |
|---|---|---|---|
| 520666 | 3/1931 | Germany | 244/91 |

OTHER PUBLICATIONS

Pop Science Feb. 1983 "Sun powered high flyer".

Brown, Stuart F., "The Eternal Airplane," Popular Science, Apr., 1994.

Primary Examiner—Galen L. Barefoot
Attorney, Agent, or Firm—Sheppard, Mullin, Richter & Hampton LLP

[57] ABSTRACT

This disclosure provides a solar rechargeable aircraft that is inexpensive to produce, is steerable, and can remain airborne almost indefinitely. The preferred aircraft is a span-loaded flying wing, having no fuselage or rudder. Travelling at relatively slow speeds, and having a two-hundred foot wingspan that mounts photovoltaic cells on most all of the wing's top surface, the aircraft uses only differential thrust of its eight propellers to turn. Each of five sections of the wing has one or more engines and photovoltaic arrays, and produces its own lift independent of the other sections, to avoid loading them. Five two-sided photovoltaic arrays, in all, are mounted on the wing, and receive photovoltaic energy both incident on top of the wing, and which is incident also from below, through a bottom, transparent surface. The aircraft is capable of a top speed of about ninety miles per hour, which enables the aircraft to attain and can continuously maintain altitudes of up to sixty-five thousand feet. Regenerative fuel cells in the wing store excess electricity for use at night, such that the aircraft can sustain its elevation indefinitely. A main spar of the wing doubles as a pressure vessel that houses hydrogen and oxygen gasses for use in the regenerative fuel cell. The aircraft has a wide variety of applications, which include weather monitoring and atmospheric testing, communications, surveillance, and other applications as well.

63 Claims, 18 Drawing Sheets

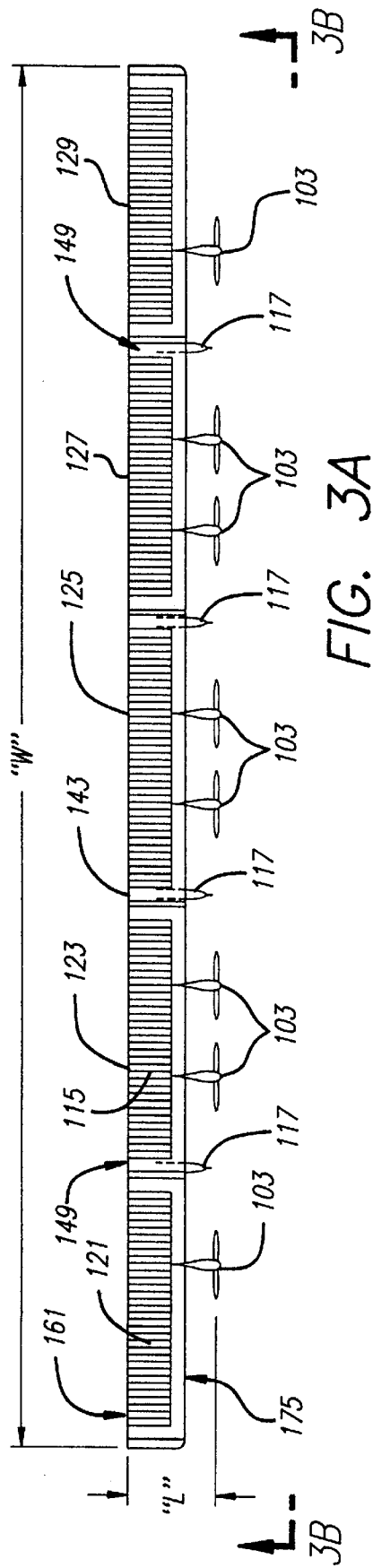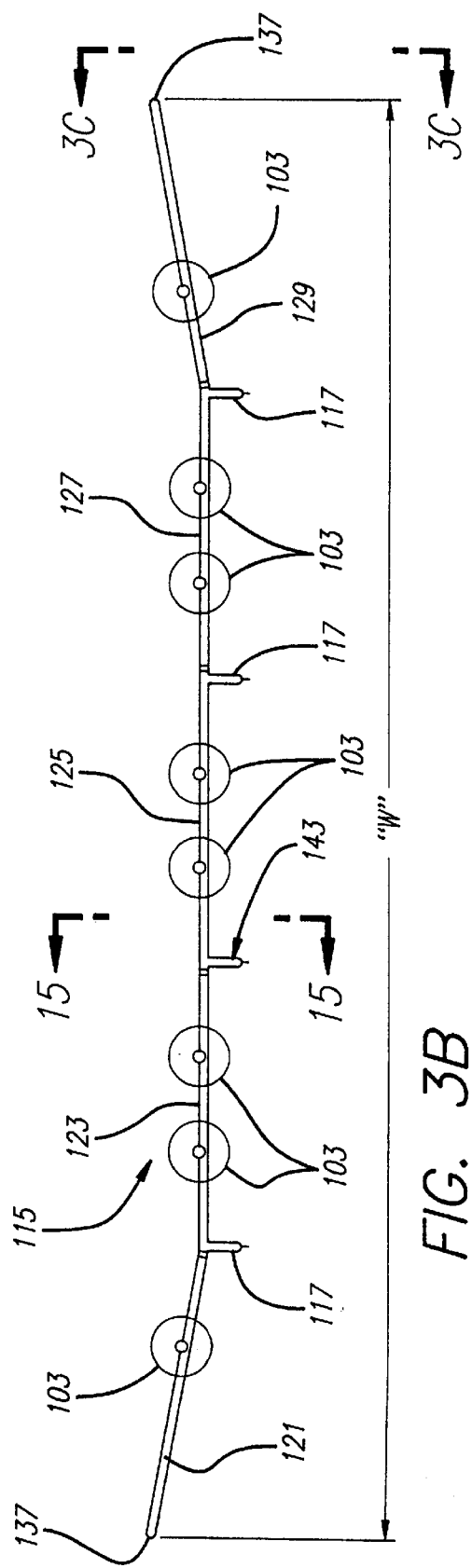

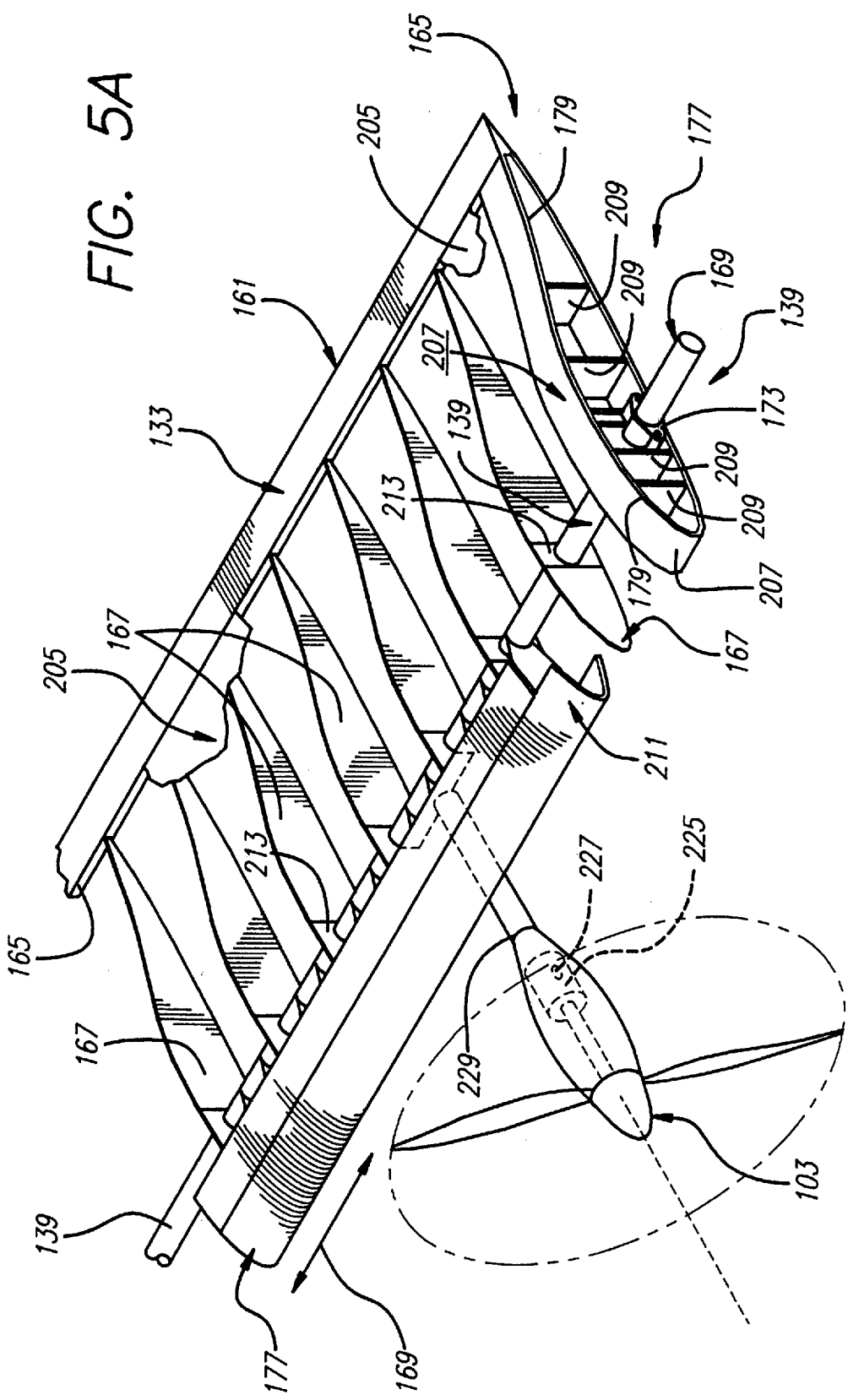

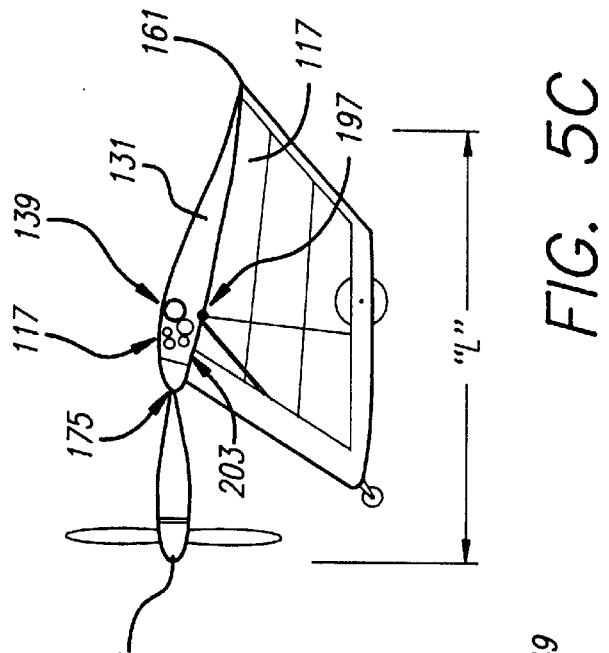
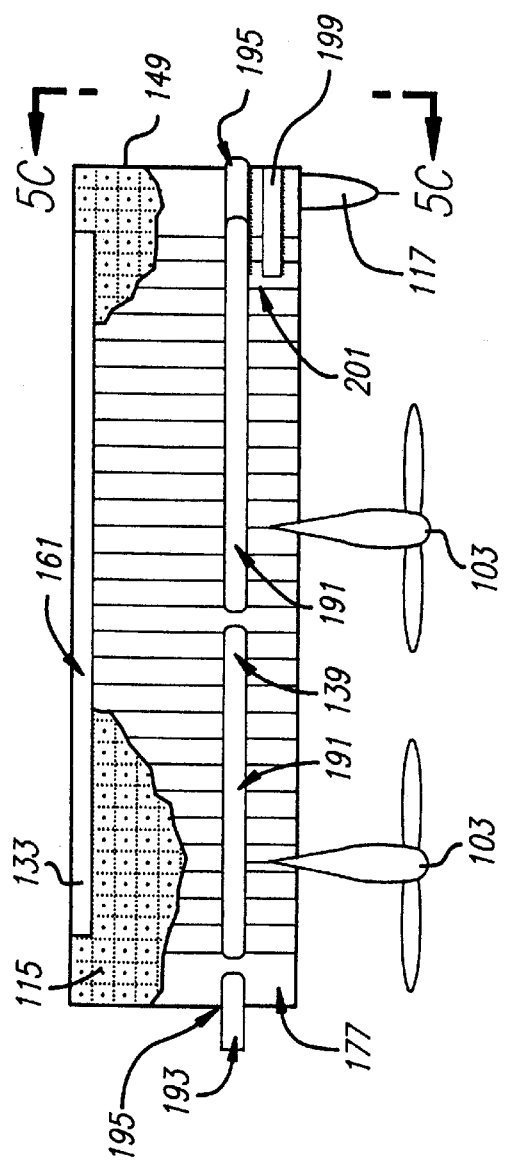
FIG. 5C
FIG. 5B

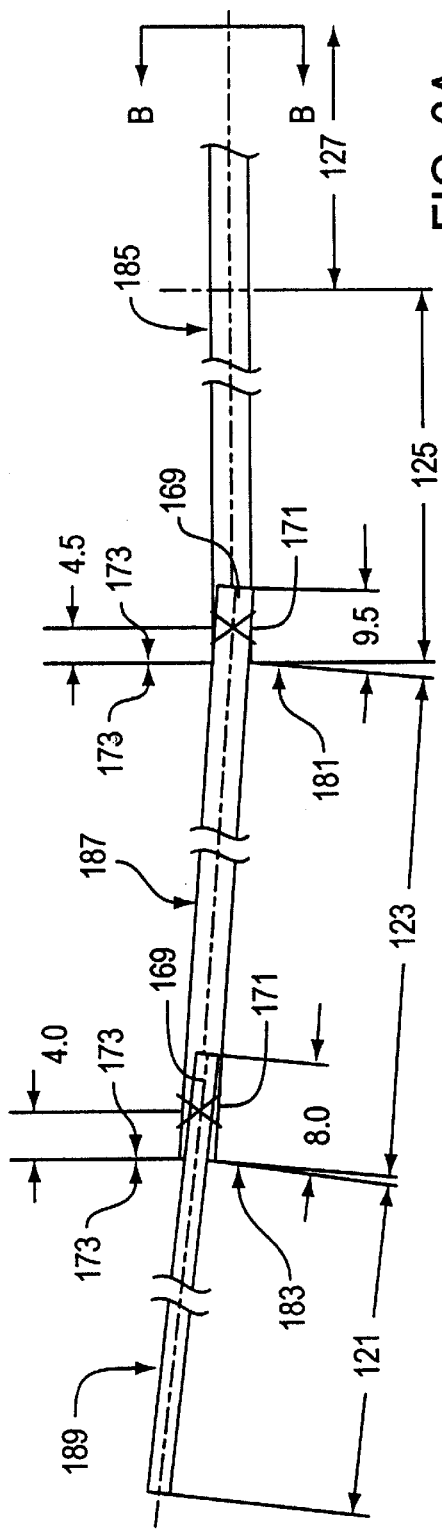
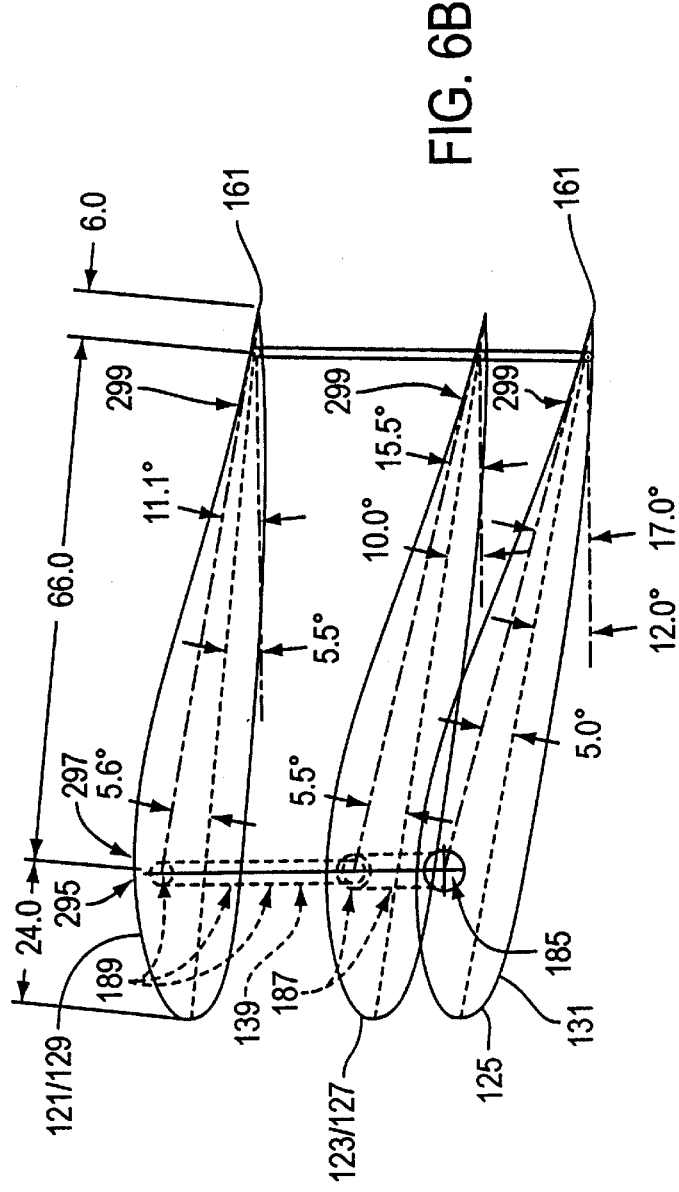
FIG. 6A
FIG. 6B

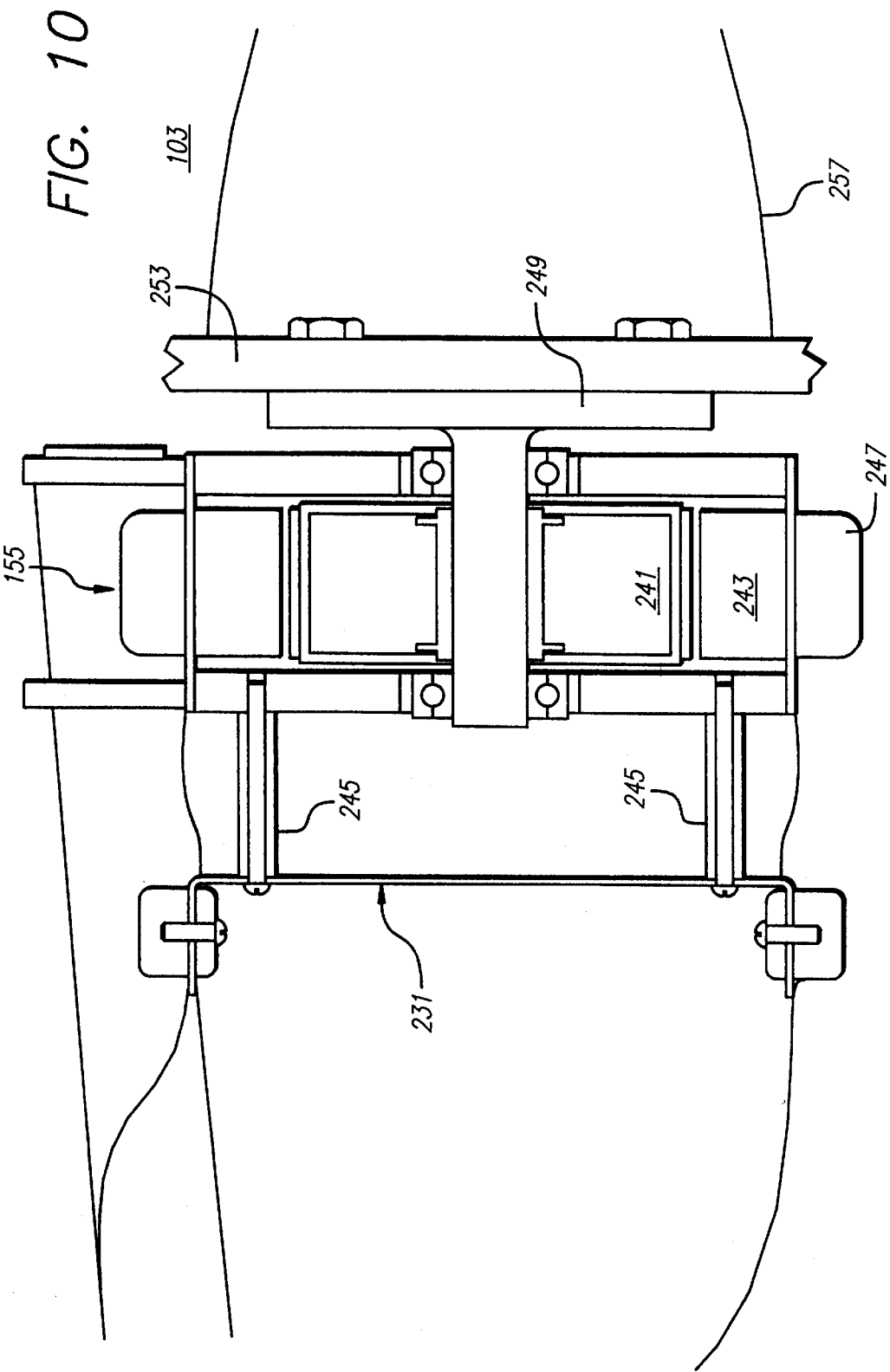

AIRCRAFT

The U.S. Government, represented by the Department of Energy, has a paid-up license in this invention and the right in limited circumstances to require the patent owner to license others on reasonable terms as provided by the terms of Contract Numbers W-7405-ENG-48, Subcontract B208882, W-7405-ENG-48, Subcontract B208850, and W-7405-ENG-48, Subcontract B208862.

The present invention relates to aircraft. More particularly, the present invention provides a solar-powered, pollution-free winged aircraft that can remain at high altitude almost indefinitely.

BACKGROUND

Aircraft have served mankind for over a hundred years and have proven useful in many different applications. Aircraft have assisted, for example, in travel, transport, surveillance, as well as in providing assistance in military conflicts. Today, man uses balloons, winged aircraft, helicopters, satellites and other aircraft to assist him in these various applications.

Yet, despite the utility of modern day aircraft, none are particularly well-suited to long duration, guided flight.

As one example, it is sometimes desired to measure and study winds, storms or pollutants in the atmosphere. Sometimes also, the government uses these aircraft to monitor troop movements or to monitor narcotics production. Winged aircraft and helicopters are not optimally suited to these tasks, because they are limited by the amount of combustible fuels that they use, which are heavy, expensive and are used-up very quickly. Typically, these types of aircraft cannot remain over their desired location for any length of time, and hence, are of limited utility in performing these tasks.

One way around some of these operational limitations is to use balloons. However, balloons are not particularly well-suited to many of these applications either, because they are at the mercy of the winds, and must change elevation to obtain favorable winds, if winds are available at all. Many times, a jet stream or other high altitude wind travels sufficiently fast to carry a balloon someplace quickly, but the balloons are not easily maneuvered to the desired altitude and the precisely-desired location. Also, a balloon does eventually return to earth, and it is difficult to control its precise spot of landing, such that equipment can be readily retrieved and re-used.

A second approach is sometimes to use satellites. However, satellites are expensive to launch, and typically remain in a permanent, fixed orbit. Some satellites can change their orbit; however, this is done only with great difficulty and expense, and there is a fuel limit to how many orbital changes a satellite may make. For example, if it is desired to measure and study a hurricane that originates in Africa and travels towards the Gulf coast of the United States, satellites cannot, practically-speaking, be asked to follow and track such a storm. The use of satellites is also disadvantageous for many types of measurement and surveillance as well, because satellites orbit outside the earth's atmosphere. That is to say, satellites as a practical matter cannot use many tools which optimally require contact with the atmosphere. Photographic images taken by a satellite are also sometimes less than optimal, since the target is usually a great distance from the satellite. Finally, satellites are not easily brought back to earth and retrieved, and so are typically used only for one very expensive, special purpose task.

Thus, conventional winged aircraft and helicopters, despite their limitations, are sometimes the most well-suited option. They are re-used frequently, in a wide variety of different missions, and may quickly travel to every part of the earth's surface. Unfortunately, most of these aircraft use fuel, and hence pollute the atmosphere. Moreover, the flight duration of these aircraft is very short, and the aircraft must travel at high speed to generate the lift needed to keep the aloft, particularly at high altitude. At high altitude, since the atmosphere is relatively thin, these aircraft must use much more fuel to maintain altitude. Given fuel costs and the expense of maintenance, most powered aircraft are operated only with large expense per flight hour.

There exists a definite need for a multi-purpose aircraft that can remain airborne for long durations without the need to re-fuel. Preferably, such an aircraft should be able to operate extensively, not only at low altitude, but also at very high altitudes, where propulsion requirements are heightened. Also, there exists a need for an aircraft that is inexpensive to build and operate and, furthermore, is pollution-free. Finally, a definite need exists for an aircraft that can perform surveillance, testing and measurement functions, like the satellite, balloon and aircraft examples given above, yet is steerable, mobile, and can perform varying missions of extended duration. The present invention meets these needs and provides further, related advantages.

SUMMARY OF THE INVENTION

The present invention solves the needs mentioned above by providing a solar powered aircraft that is inexpensive to produce and can remain aloft almost indefinitely, that is, at least until its parts wear out. Thus, the present invention provides an aircraft that is perfectly suited to many of the applications mentioned above. For example, the aircraft could be guided to follow a hurricane, and using equipment on board, study how such storms originate and develop. Alternatively, the present aircraft provides a mobile communications platform that can be used to bounce communications or other signals, in much the same manner as satellites and aircraft are now sometimes used. However, the present aircraft is not only far less expensive to produce than satellites; it is retrievable and may be re-used for the same or different tasks. By using solar power, the present aircraft is completely pollution free, and thus, provides potent promise for displacing the use of combustion-powered aircraft in many of these applications.

One form of the invention provides an aircraft having a wing, where the wingspan is at least four times the maximum length of the aircraft. This wing mounts at least two aircraft engines at different positions along the wingspan. In more particular aspects of the invention, the aircraft has no rudder, and turns by driving one engine faster than another. In a typical aircraft having multiple engines, this would primarily cause the aircraft to roll. However, in part due to its large wingspan-to-length ratio, this differential thrust is effective to turn the aircraft without excessive roll. In still more particular aspects of the invention, the aircraft is a flying-wing in the truest sense of the word, un-swept, with no main fuselage; rather, control electronics and landing gear are distributed in several pods, borne underneath the wing at distributed locations.

A second form of the invention provides a solar array, an energy storage system and an electric engine which are all mounted on the aircraft. The solar array generates sufficient surplus energy during daylight to both completely drive the electric engine during daylight, and also to store sufficient surplus energy in the energy storage system to drive the electric engine overnight. Accordingly, this second form of the invention provides an aircraft which emits no pollution and generates all of its own power directly or indirectly from the sun. In its more particular aspects, the energy storage system of second form of the invention is a regenerative fuel cell, which dissociates water into hydrogen and oxygen gasses, and recombines them, to thereby temporarily store electricity provided by the solar array for use during night. Further, it converts enough energy during one day of sunlight to sustain the aircraft's flight at a constant elevation for at least a twenty-four hour period, and so, it can remain airborne almost indefinitely.

A third form of the invention provides a monitoring system that performs surveillance and relays information to a remote station. More particularly, the solar powered aircraft described above is directed to fly missions where it may monitor or test atmospheric or other conditions, and relay information back to the remote station. This form of the invention is notable in that the solar powered aircraft mechanically produces propulsion using substantially only solar power.

Similarly, a fourth form of the invention provides a relay system that uses the solar powered aircraft to relay communications or other signals. Thus, the solar powered aircraft can be used in much the same manner as satellites, for bouncing communications from a source of the communications or other signal to a target.

Other forms of the invention provide new aircraft structures. For example, a fifth form of the invention relates to an aircraft wing. More particularly, this wing has an upward surface and a downward surface that combine to create lift, with a solar array mounted on the upward surface. The solar array spans a substantial portion of the wingspan, and is supported by a structural member that extends along the wingspan. This structural member is positioned relatively close to the solar array and the upward surface, and it is also the point of least flex of the wing. Thus, the solar array is protected, in that its bending, compression and tension are tied closely to the least-bending part of the wing.

A sixth form of the invention specifies that the aircraft consists essentially of a single wing that has no rudder. Like the fifth form of the invention, discussed above, the wing has a main spar that forms its principal structural member along the wingspan. Each section includes an airfoil and an aircraft engine, and produces sufficient lift to support its own weight during flight.

A seventh form of the invention specifies that the aircraft's wingspan is at least four times the aircraft's maximum length. The wing is formed of at least two individual sections which are connected together along the wingspan. Each of these sections includes its own airfoil, and both of a solar array and an electric engine that propel the aircraft by causing the airfoil to generate lift. More particularly, each electric engine receives substantially all of its driving electricity from the solar array next to it, and therefore, is not dependent upon a different section or central distribution point of the aircraft for electricity. This reduces the materials otherwise needed for the aircraft, and saves cost and weight.

An eighth form of the invention relates to a span-loader feature of the aircraft. More particularly, it specifies that the aircraft has a distribution of weight where no ten percent portion of the wingspan weighs more than thirty percent of the weight of the aircraft. Thus, this form of the invention relates to an aircraft that, unlike many conventional aircraft, does not have the bulk of its weight at the center, invested in a main fuselage. Rather, to minimize the load placed on each part of the wing, the aircraft is composed of parts that each substantially carry their own load. By reducing structural weight, the aircraft does not require large speeds to enable the wings to generate enormous lifting force, as do many standard aircraft.

A ninth form of the invention relates to a landing gear feature of the aircraft. In particular, all of wheels of a landing gear are mounted by the wing and are positioned at different locations along the length dimension of the aircraft. More particular aspects of this ninth form of the invention are that the aircraft lifts off the main gear first, and that it naturally lands touching its front-most wheels first in order to reduce pitch control requirements. This feature differs from many conventional aircraft, which touch the back wheels first during landing, to prevent the front wheels from bouncing.

A tenth form of the invention specifies that the aircraft is substantially free of a fuselage along its length dimension. More particularly, this form of the invention specifies that the aircraft includes a substantially un-swept wing, a number of engines that overhang the wing, in front of it, and a number of fins that extend vertically downward from the wing. The fins are distributed along the wingspan, and each has a vertical length that is at least fifty percent of the aircraft's length.

Finally, an eleventh form of the invention relates to the regenerative fuel cell structure of the aircraft, and its use of a main structural member along the wing that has a hollow region within itself. The regenerative fuel cell operates by dissociating a chemical substance into at least two components and recombining the components to reform the chemical substance. To store one of these components, or the chemical substance, the hollow region acts as a storage tank. In this manner, the preferred aircraft takes advantage of the aircraft structure, and eliminates the need for at least one storage tank by using a rigid structural member for that purpose.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 3A is a top view of the preferred solar rechargeable aircraft; the figure illustrates five sections of the wing, which are assembled together to form the aircraft.

FIG. 3B is a front view of the aircraft of FIG. 3A, taken along lines B—B of FIG. 3A.

FIG. 5A is a perspective, cut-away view showing construction of one section of the wing of the aircraft of FIG. 3A; the figure also shows use of a main structural member, or main spar, that supports the wing.

FIG. 5B is a top, cut-away view of one section the wing, and indicates an embodiment of the aircraft where a regenerative fuel cell is structured within the wing. FIG. 5B also illustrates the use of oxygen and hydrogen tanks within the main spar of the wing.

FIG. 5C is a cross-sectional side view of the aircraft of FIG. 5B, taken along lines C—C of FIG. 5B.

FIG. 6A is a front diagram of the main spar, with multiple sections of the wing being assembled together; the figure indicates the relative size of the spar in each of the five sections of the aircraft.

FIG. 6B is a side view of the main spar of FIG. 6A, taken along line B—B of FIG. 6A. FIG. 6B shows the elevation of various sections of the wing when the aircraft is in flight. Notably, FIG. 6B also indicates that the preferred wing is of constant cross-sectional area and shape along the entire wingspan of the aircraft. It also shows that the wing has washout in that tip is more nose down than at the center of the aircraft.

FIG. 10 is a cross-sectional view of one of the eight electronic engines of the preferred aircraft.

DETAILED DESCRIPTION

Figure 1A:
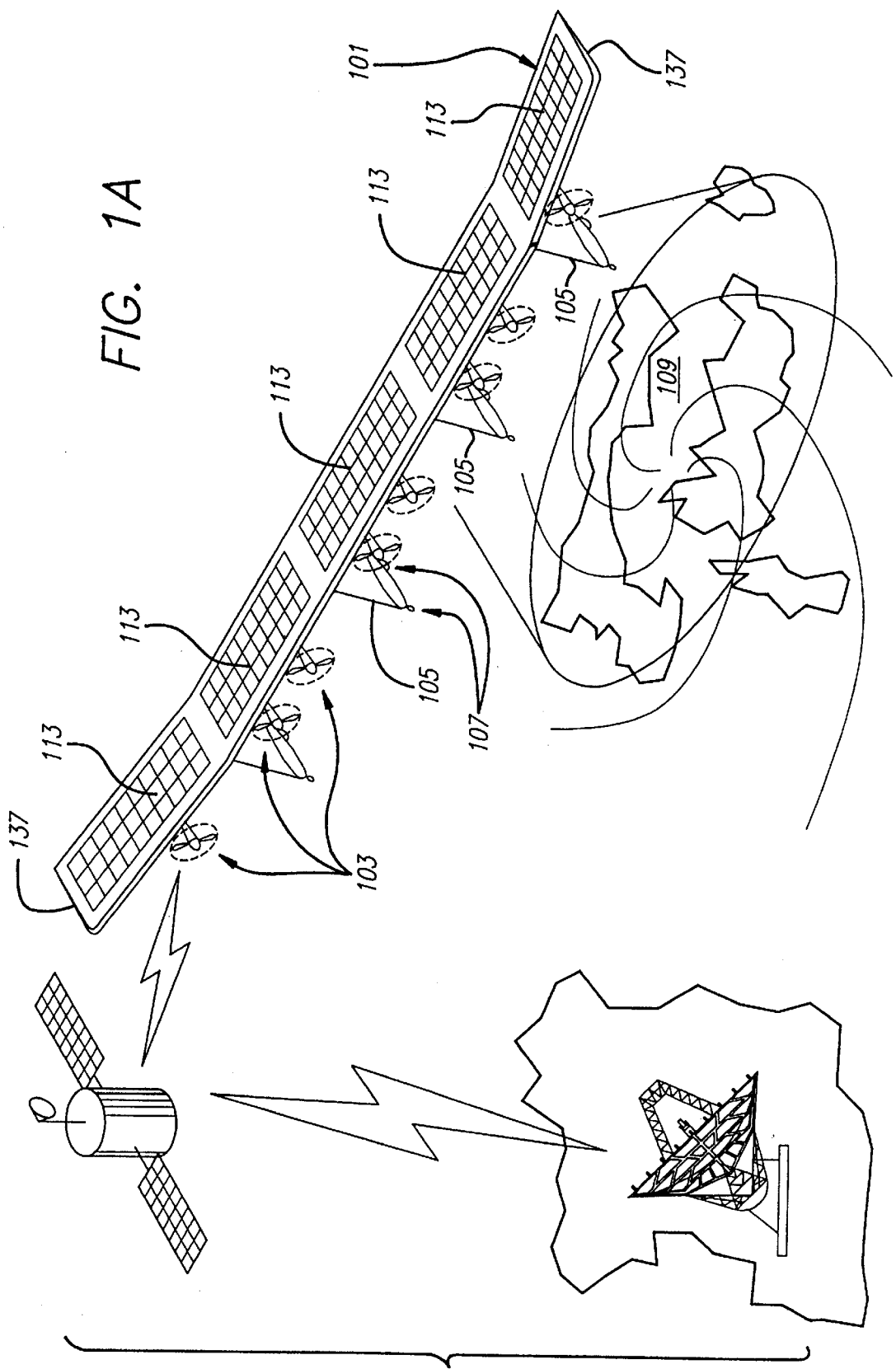
FIG. 1A is an illustrative view of a severe storm monitoring role of the preferred aircraft; a solar rechargeable aircraft monitors a weather condition, and relays information, via satellite, to a ground-based station.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the specific implementation of an aircraft, in particular, one that is used for high altitude, long duration flight.

Introduction to the Preferred Aircraft

In accordance with the present invention, the preferred embodiment is a solar rechargeable aircraft 101. Otherwise stated, the aircraft does not use combustion engines at all and does not carry fuel per se. Except for pre-charge of the energy storage system before takeoff, the aircraft derives all of its propulsion energy from the sun. Thus, the aircraft has an unending supply of energy, does not pollute the environment, and is not encumbered by a weighty fuel supply.

The preferred embodiment 101 is also a single-wing aircraft, that is, an aircraft that has a wingspan "W" that is at least four times the length "L" of the aircraft. Whereas most other types of winged aircraft have at least a fuselage and a tail section, the preferred aircraft does not. It is a "flying wing" in the truest sense of the word, consisting of a two-hundred foot wing with eight propeller engines 103 extending in front of it and four vertical fins 105, or pods, extending beneath it. It is these fins that mount at their bottom end the aircraft's landing gear 107.

Figure 1B:
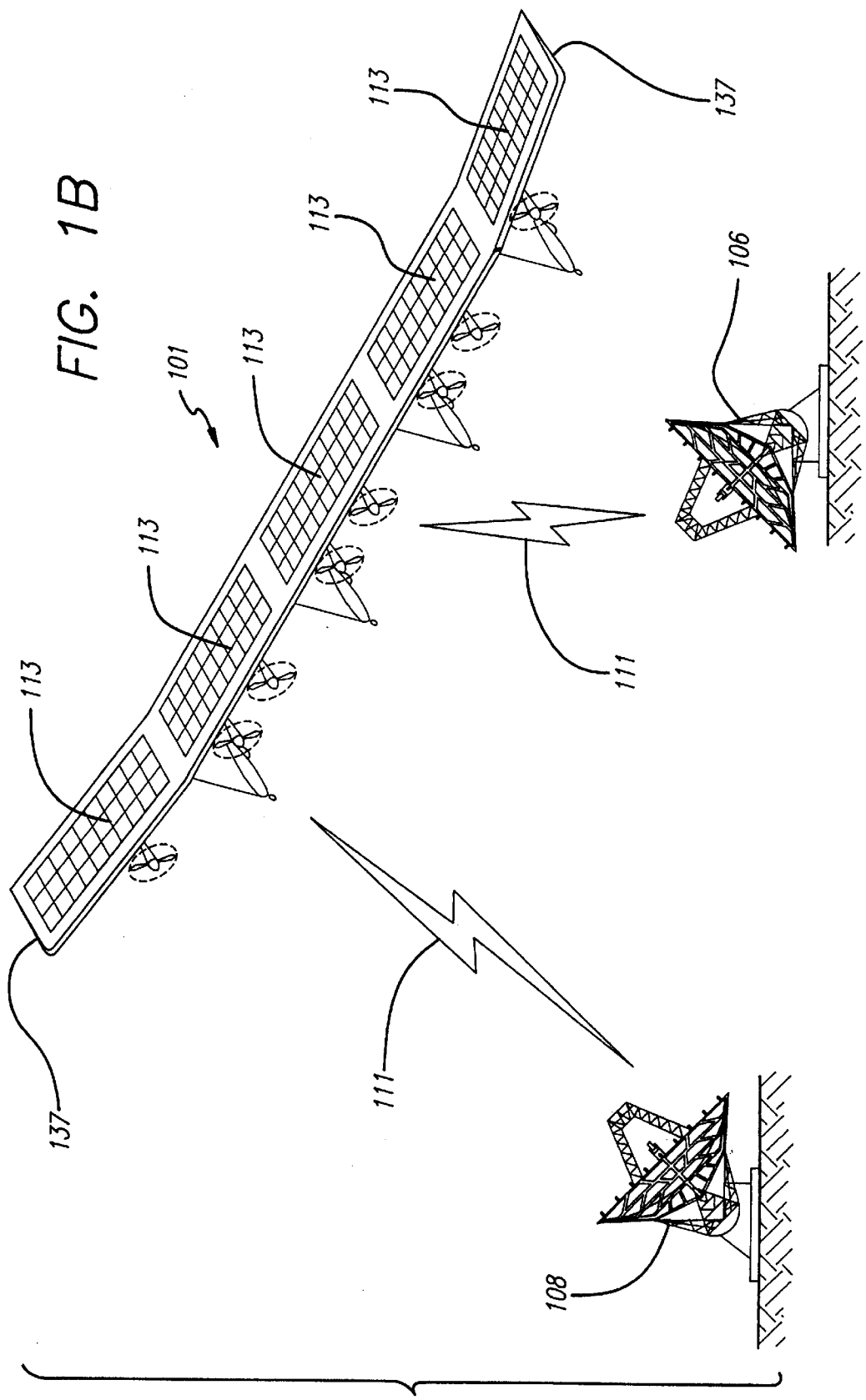
FIG. 1B is an illustrative view of a relay role of the preferred aircraft; a solar rechargeable aircraft receives communication or another signal from a source and relays that communication to a target, which is capable of direct contact with the source.

The aircraft 101 is ideally suited for certain types of prolonged missions. These include, for example, monitoring weather, providing a mobile, reusable communications platform, performing surveillance, testing atmospheric conditions, and many other activities as well. For example, the present aircraft can be applied to high altitude weather surveillance, and have its course or flight pattern changed to follow a hurricane 109 at high altitudes, where the aircraft is well out of danger. This particular application is indicated in FIG. 1A; FIG. 1B illustrates the solar rechargeable aircraft used to relay a signal 111 from a source 106 to a remote target 108. In this latter application, for example, the solar rechargeable aircraft could be used in summer duty above one of the great lakes, to provide a radio relay for boaters.

The aircraft 101 is designed to fly continuous, unmanned missions of 3000 hours, or longer, which is greater than the mean time between overhauls for most aircraft. Therefore, the aircraft is designed with reliability foremost in mind. This reliability is at least partially aided using redundancy, that is, by providing many back-up systems aboard the aircraft. In this manner, if one part gives out, the aircraft can continue its mission. For example, the preferred aircraft has eight propeller engines 103; if one engine gives out over time, the other seven can take over. Because motor cooling is optimized for efficiency, each of the motors can operate at twice its designed power without overheating.

For purposes of this introduction, certain design features that assist the aircraft's high altitude, long duration flight will be briefly discussed.

First, the preferred aircraft 101 is designed to be very power efficient and has a solar array 113 mounted proximate to each propeller engine 103. It uses five solar arrays, one in each of its five sections, such that solar arrays occupy most of the upward surface 115 of the aircraft. The capacity of these arrays far exceeds the engines' instantaneous power requirements, so that more electrical energy than required by the propeller engines 103 is generated each daylight period. To provide power when sunlight is not available, e.g., at night, the aircraft stores excess electrical energy in an energy storage system 119 including multiple power cells aboard the aircraft. This energy is used to keep the aircraft continuously airborne.

Second, each of five 40-foot wide wing sections 121, 123, 125, 127 and 129 is designed to support its own weight during flight, and thus avoid loading any other section of the aircraft. That is, the present aircraft 101 is unlike many conventional aircraft structures, which use a heavy main wing spar to transfer a large amount of lift to help support a fuselage and tail structure during flight. Rather, each section of the preferred aircraft has its own airfoil 131 and, therefore, there is no significant portion of the aircraft that does not produce its own lift. Thus, the present aircraft does not need to compensate for non-lifting structures, such as a fuselage, and does not require a strong spar to stay airborne. The aircraft is light (less than 1 pound per square foot of wing area), travels at relatively slow air speeds (from 15 miles per hour to, at high altitude, 100 miles per hour), and it therefore needs relatively little electrical power from the solar arrays 113 in order to stay airborne.

Third, the preferred embodiment 101 has no rudder or ailerons, and it therefore moves and turns in unusual fashion. It does have many elevator flaps 133 that are used to change the aircraft's angle of attack, and these could easily be configured for use as ailerons. However, in the preferred embodiment this is not done, and the preferred aircraft turns using differential thrust. The aircraft relies upon its large wingspan "W" and small velocity to avoid yaw instability. The vertical fins 105, or pods which extend beneath the wing 135, serve to prevent unwanted sideslip and so-called "dutch-roll" during the aircraft's turns.

To summarize the practical effect of these design features, the preferred aircraft 101 generates more electrical energy than it can use during the day, and it stores this energy in an energy storage system 119, consisting of a conventional rechargeable battery 275 or a rechargeable fuel cell 104, for use at night. The aircraft has no fuselage or bulky tail structure that would increase the aircraft's weight, and so, it weighs less than 0.73 pounds per square foot of wing area. The aircraft needs relatively little power to stay aloft, even at altitudes of over 65,000 feet, although it must move relatively fast (90 miles per hour) to maintain such altitude. Since enough solar power is converted into electrical energy during the day to power the aircraft around the clock, even at very high altitudes, the aircraft has the capability of staying airborne for months or even years, essentially until the aircraft "shuts-down," either in response to a deliberate command, or due to old-age and the wear of parts.

Each of these design features will be discussed in greater detail below, intermixed into the rest of the description of the preferred aircraft. However, it deserves mentioned that many exemplary applications and advantages of the preferred aircraft are described in an article appearing in the April 1994 issue of *Popular Science*. That article is entitled "The Eternal Airplane," and it describes both a forerunner of the present aircraft, called "pathfinder," as well as certain planned features of the present aircraft, which called "Helios" in the article. The *Popular Science* article is hereby incorporated into this disclosure by reference, as though fully set forth herein.

The Modular Structure of the Aircraft and Module Interconnection

Figure 2A:
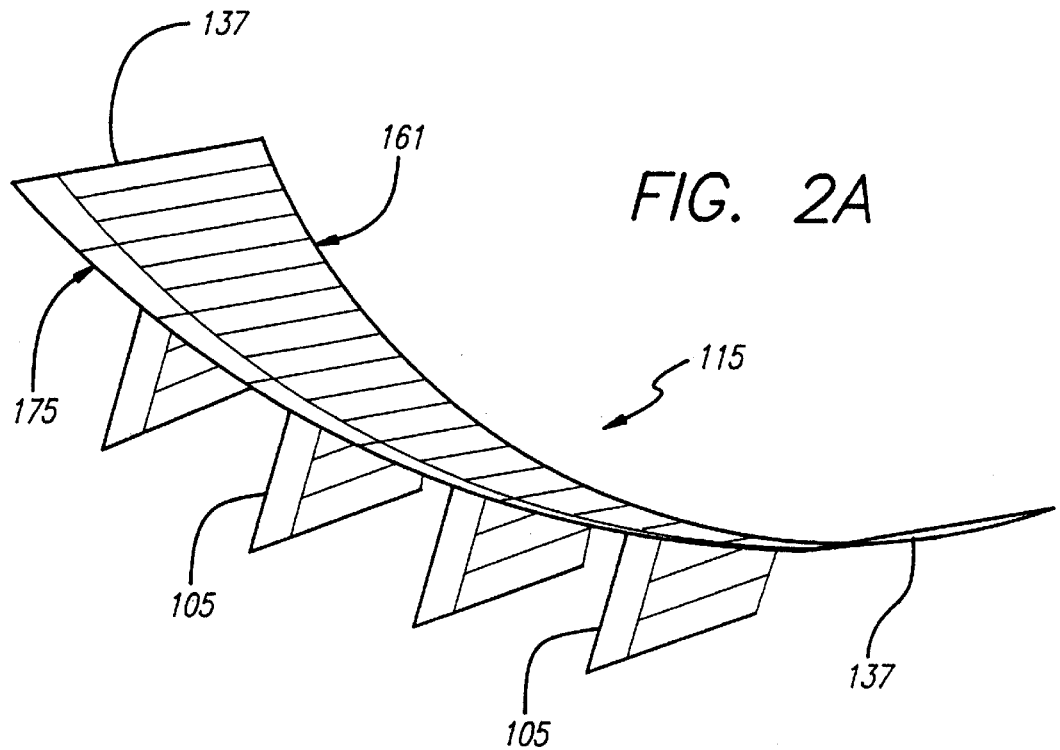
FIG. 2A is an illustrative view of the preferred solar rechargeable aircraft during flight; the figure shows the natural bending of the wing of the aircraft and its position of least stress, i.e., when the craft is airborne.
Figure 2B:
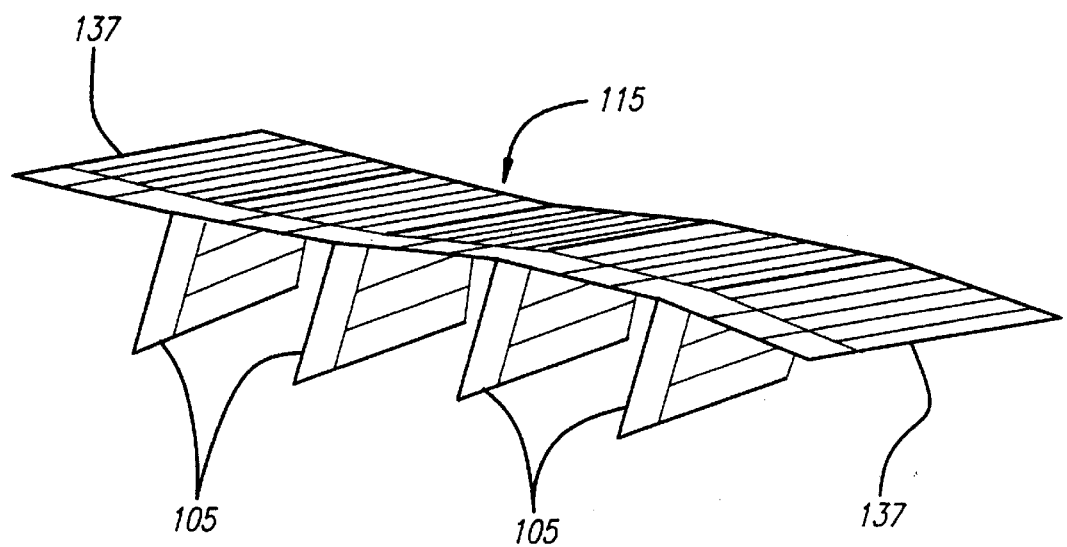
FIG. 2B is another illustrative view, similar to FIG. 2A, but which indicates abnormal bending of the wing of the aircraft and the position of its greatest stress, i.e., when the aircraft is grounded.

The aircraft 101 has a modular structure which is best introduced with reference to FIGS. 2A–B 3A–D. FIGS. 2A and 2B show a simplified model of the aircraft, without engines. They help illustrate the natural and stressed positions of the aircraft, with the five sections of the aircraft assembled together. FIG. 2A, in particular, shows a perspective view of the preferred embodiment, and helps illustrate the natural curve of the wings, seen during flight. FIG. 2B, by contrast, shows the same view of the preferred aircraft, but with the wing-tips 137 bent downward, as they would be when the aircraft is on the ground. The aircraft naturally has a "dihedral" or upward bending of the wings (as indicated in FIG. 2A), when in the wing's position of least stress. This dihedral provides roll stability and eliminates the need for direct roll control.

FIGS. 3A–D show the structure of the aircraft 101 in greater detail. Notably, the aircraft is composed of five sections 121, 123, 125, 127 and 129, each of which forms a part of the wing 135. Each section is basically an airfoil that generates lift as the aircraft moves relative to the atmosphere. Further, each section has several identical dimensions, including constant (not tapered) cross-sectional wing shape and size, a 40-foot wingspan and 8-foot length. Together, they form an assembled aircraft wing 135 that is 8 feet long, 200 feet in wingspan and which rides upon four vertical fins 105 approximately six-seven feet off the ground. Interestingly, these particular dimensions were chosen because 40 feet is the maximum trailer size in many states, and the 40-foot sizing permits the aircraft to be easily transported by ground. The eight foot length of the wing 135 was chosen to permit the aircraft to be easily manually worked on, since four feet is approximately the maximum human reach, from the fore or aft of the wing. All five of the sections have a principal structural member, or main spar 139, which provides the primary structural connection to the other sections. Thus, the main spars are rigidly connected together when the five sections are assembled together to form the aircraft. In addition to the spar, each section also has at least one engine and solar array combination (some sections have two). This enables the preferred aircraft to be designed such that each section generates lift to support its own weight, and not load other sections, as alluded to above.

The five sections of the aircraft include one unique center section 125, two intermediate sections 123 and 127, and two wing-tip sections 121 and 129.

As can be seen from FIG. 3B, the center section 125 is designed to fly on a level. The left and right intermediate sections 123 and 127 of the wing connect at an angle with this center section, bending upward to form a dihedral. As noted in FIG. 6A, the left and right intermediate sections 123 and 127 form a three degree dihedral with the center section 125, whereas the left and right wing-tip sections 121 and 129 form a 6.5 degree dihedral with the center section. The center section is completely balanced about its middle, having a middle airfoil portion 141, two propellers 103 and two pods 105. These pods are vertical fins that extend downward from the wing, and each mounts a landing gear 109, having front and rear wheels 259 and 261. One of these pods, or fins, is used to carry electronics and payload. This "control pod" 143 carries control electronics, including an autopilot principally embodied as software, to control the engines and elevator flaps. In addition, the control pod carries power supplies and sensors, including global positioning system ("GPS") equipment, as well as test equipment, surveillance equipment or a payload, depending upon the particular application.

The two intermediate sections 123 and 127 of the aircraft each also have two propeller engines 103, but have only a single pod 147, positioned at the sections' outer ends 149. These fins are also battery pods as well, such that the middle three sections 123, 125 and 127 of the aircraft each have one battery pod 117, whereas the center section 125 of the aircraft mounts all of the control electronics for the aircraft.

Finally, the wing-tip sections 121 and 129 each mount at least one propeller engine 103 and one solar array 113, and combine with the intermediate sections 123 and 127 to form a 6.5 degree dihedral with the center section 125. Unlike the middle three sections 123, 125 and 127, the wing-tip sections 121 and 129 do not have their own battery or regenerative fuel cells, and they feature a main spar 139 of reduced diameter.

Since each of the five sections supports its own weight, and not a main fuselage, the wing 135 needs no taper at its ends, but is of constant dimensions. This design permits even more solar cells to be mounted by the aircraft 101 than would otherwise be the case, and virtually the entire upper surface 115 of the wing is used for conversion of solar energy to electricity. Present day technology has produced some solar cells which exceed twenty percent in conversion efficiency, and it is expected that as the efficiency of solar cells increase, the required wingspan of the aircraft to support a given load will decrease.

Since the solar arrays 113 make up much of the weight of the aircraft, the preferred aircraft 101 is designed to be a span-loader. That is to say, the preferred aircraft has its weight fairly evenly distributed across its entire wingspan "W" at all stages of flight. This differs from many conventional aircraft designs which achieve some re-distribution of weight by mounting fuel tanks in the wings, but which change in these characteristics as fuel is used-up.

A typical 200-foot wingspan aircraft built according to the specifications herein will weigh approximately 1,165 pounds. Of this, the wing itself weighs 222 pounds, while the storage system for the regenerative fuel cell adds about 260 pounds, distributed over the center and intermediate sections of the aircraft. Finally, each pod assembly weighs about 116 pounds, while each motor weighs about 20 pounds. Thus, unlike many other aircraft, the present aircraft preferably has its weight distributed at all stages of flight, such that no 10 percent portion of the aircraft in the wingspan dimension weighs more than 18 percent of the overall weight of the aircraft.

Figure 4:
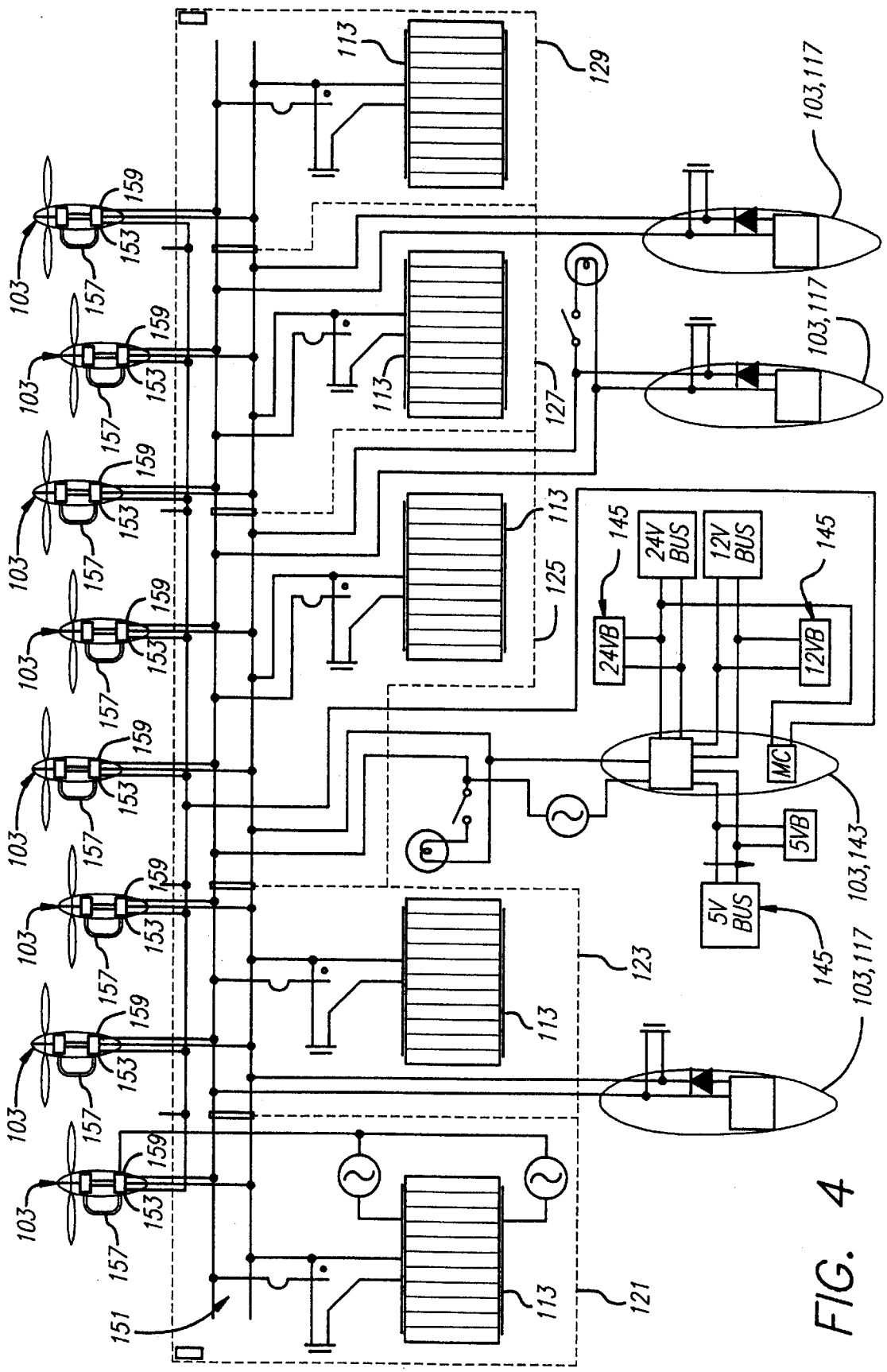
FIG. 4 is a diagram of the power system of the aircraft of FIG. 3A, and indicates eight engines, five solar arrays, and control electronics of the aircraft. The figure shows the use of one battery pod in each of the three center sections of the aircraft, as well as a control pod which is vertically mounted below the center section.

FIG. 4 helps illustrate the arrangement of the five sections of the aircraft from a control perspective. Each of the aircraft's five sections, one center (125), two intermediate (123 and 127) and two wing-tip (121 and 129), are indicated in phantom lines. The five solar arrays 113 mounted by these sections are coupled to a common power bus 151 that extends along the entire 200-foot wingspan of the aircraft. By distributing power in this manner, cabling requirements are reduced from what they would be if a central distribution point was required. Furthermore, if any one solar array 113 becomes deficient, an engine may obtain its power from the other solar arrays, or from the batteries. The battery pods 117 are illustrated in FIG. 4 as well, one for each of the three middle sections of the aircraft. The vertical fins 103 may hold either a panel of rechargeable batteries, or carry an electrolysis device that supplies electricity stored in the form of hydrogen and oxygen gases. The use of rechargeable batteries is preferable in applications where days are long and nights are short, such that only small storage capacity is required and the relatively heavier regenerative (water) fuel cell is not required, because its weight is determined more by the power it processes than by the energy stored.

Each propeller engine 103 receives a direct current power input from the solar arrays 113 and the energy storage system 119, together with a pulse-width modulated ("PWM") 5 volt control signal addressed to the particular engine from the control pod 143. An inverter 153 for each motor 155 uses the solar arrays as a power supply, from which the motor generates a variable frequency, alternating current supply that controls motor torque. As illustrated in FIG. 4, the motors' inverters 153 each receive a feedback signal from Hall-effect detectors (not shown) in the motor 155, to effectively implement a torque feedback loop 157 for control of the motors. Each motor includes a heat sensor 159, which provides an electronic indication both to the control pod 143 and to display units used by operators on the ground.

Aside from controlling motor current for each of the aircraft's eight propeller engines 103, the control pod 143 also controls all of the (twenty-plus) elevator flaps 133, which cover approximately the entire trailing edge 161. The flaps are each actuated using 5 volt servo mechanisms 163, each of which is digitally addressed by the control pod 143 and receives a PWM signal that indicates the desired elevator angle. Although not seen in FIG. 4, the control pod 143 is also coupled to a number of sensors including four GPS antennas, positioned at different locations on the aircraft. These GPS antennas are separate from a communications antenna on the aircraft, and are used to provide pitch, roll and yaw sensing. In the alternative to use of a global positioning system, the aircraft may make use of sets of commercial angular rate sensors and air speed sensors in well-known fashion.

Besides monitoring these antennas, the control pod 143 also monitors triply-redundant flight data sensors. Air speed sensors are mounted upon a graphite boom that extends forward of the control pod to sense air speed. A second graphite boom extending from the center battery pod mounts a yaw sensor.

Finally, the control pod also provides control signals for port wing-tip and landing lights and starboard wing-tip and landing lights.

Using the aforementioned control scheme, the control pod can vary angle of attack of the aircraft, the amount of thrust generated, and the yaw (or turn) rate using differential thrust of the eight propeller engines 103.

Materials used to Construct the Wing

FIG. 5A shows a section of the aircraft 101 in exploded form, to help illustrate how the aircraft wing 135 is constructed. As seen in FIG. 5A, the basic structural components of the wing include a main spar 139 and a trailing edge spar 165, along the wingspan dimension 169, and a large number of ribs 167 along the aircraft's length dimension. The main spar 139 provides the main structural element of the aircraft along the wingspan dimension. They maintain the ribs 167 at a predetermined spacing (20 inches), and also help fasten each of the five sections 121, 123, 125, 127 and 129 to its neighbor sections.

Figure 7B:
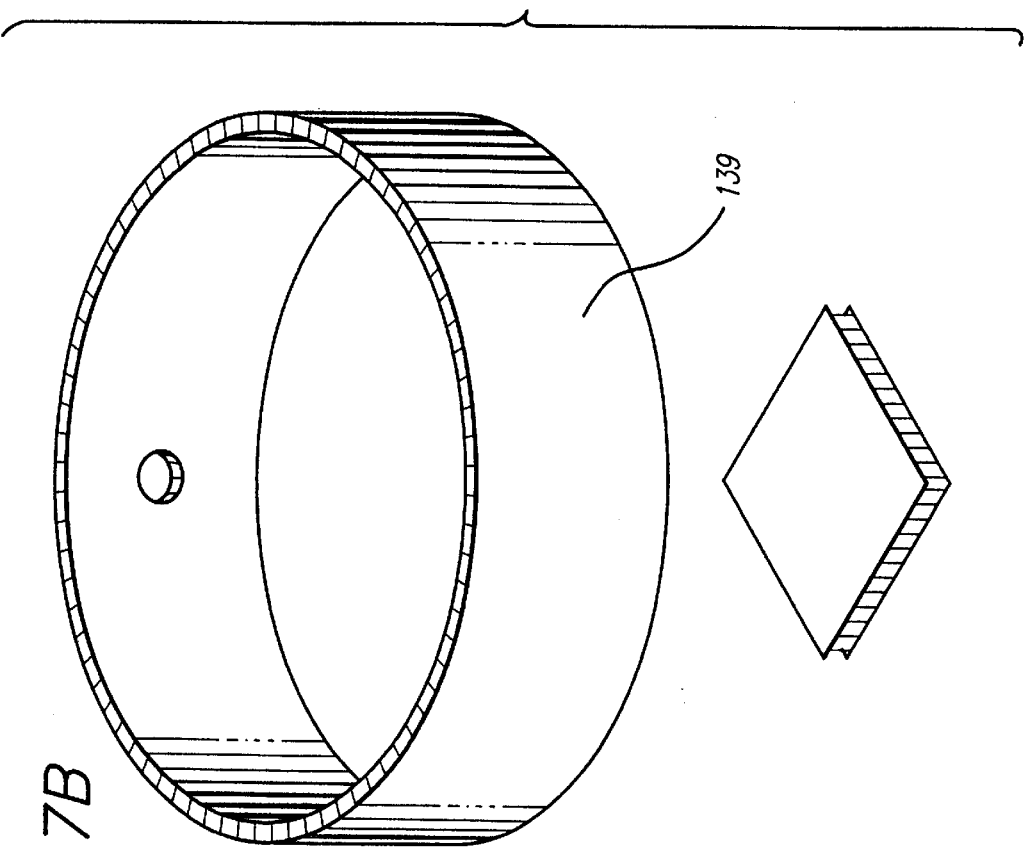
FIG. 7B shows another perspective view of a section of the main spar of FIG. 6A.
Figure 7A:
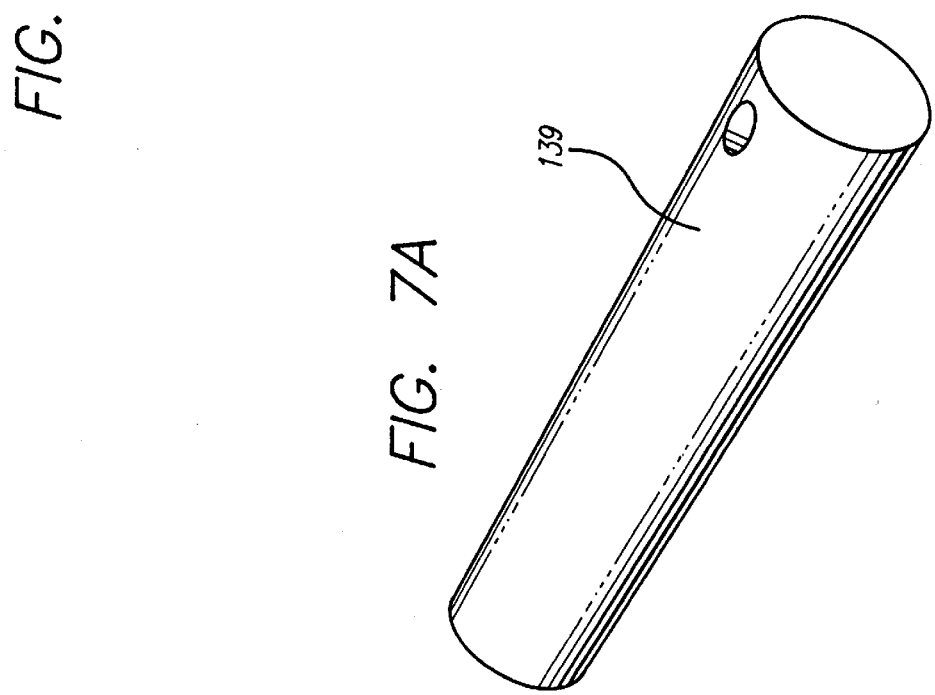
FIG. 7A shows a perspective view of a section of the main spar of FIG. 6A.

As seen in FIG. 5A, the main spar 139 is a hollow, carbon fiber tube, with stabilization provided by NOMEX™ honeycomb and KEVLAR™ fabric. Sections of the main spar material are seen in FIGS. 7A and 7B. The main spar 139 has certain design features that respectively relate to attachment of the five aircraft sections together, the mounting of the propeller engines 103, and the double-duty use of the spar as a storage tank for the regenerative fuel cell 104, described further below.

As seen in FIG. 5A, the ends of the main spar for each section are used to help connect the aircraft together. The main spar of each of the two intermediate sections and two wing-tip sections protrudes from the section inward, toward the center of the aircraft. Here, they form a male connector 169 that will be inserted into a female connector 171 of the neighboring section. To this effect, the diameter of the main spar for the center section 125 is eight inches, six inches for the two intermediate sections 123 and 127, and 4½ inches for the wing-tip sections 121 and 129. The wing-tip ends of the spars for the three middle sections form the female connectors 171. These female connectors receive the smaller diameter male connector 169 of the adjoining sections during assembly of the aircraft. Also, the female connectors include a pair of doughnuts (not shown) which fit inside their bores, and which snugly receive the corresponding male connector. The doughnuts are specially configured to mount the male connector of the adjoining section at the desired dihedral (3° for the intermediate sections and 3.5° for the wing-tip sections).

Each of the male and female connectors 169 and 171 also features a flange 173 which directly interfaces with a flange of the reciprocating connector 171 or 169. As with the doughnuts, the flange of the female connectors 171 is also mounted at a slight angle, corresponding to the desired dihedral. As the aircraft 101 is assembled, the flanges 173 are rigidly bolted together, to hold the neighboring sections of the aircraft in immediate contact. Once the flange pairs are bolted together, attachment between the sections is completed by tensioning the leading and trailing edges 175 and 161 of the wing together. This is done at the trailing edge 161 using a strand of braided nylon, which is simply tied tightly around end boxes 177 of the adjoining sections. At the leading edge 175, the sections are brought tightly together using strands of KEVLAR™. The KEVLAR™ strands are wound through a hollow bolt (not shown), which is then rotated to increase the tension of the KEVLAR ™ and restrained within the wing 135. Electrical connections between adjacent sections are completed by coupling together a logic bus at each of the leading and trailing edges, as well as a main power bus connector, at the leading edge 175. The connection between neighboring sections is then completed by taping over their mutual joint 179, to reduce drag.

FIG. 6A helps illustrate the telescoping arrangement of the spars 139, and the dihedral formed by each of the center/intermediate and intermediate/wing-tip section interfaces 181 and 183. This is also illustrated in FIG. 6B, which shows an elevational comparison of each of the three different sections 121, 123, 125, 127 and 129 of aircraft. As seen FIG. 6B, the cross-sectional shape and size of the wing 135 is constant across the entire aircraft, although the relative sizes of the center section spar 185, intermediate section spar 187 and wing tip section spar 189 are different.

Notably, the configuration described above for the connection of the main spar (in general) 139 is somewhat different for the case where regenerative fuel cells 104 are used. In this latter event, the spars for the intermediate and center sections 187 and 185 each hold hydrogen and oxygen gases in hermetically sealed tanks 191 within the spars, and all three sections have a spar that is twelve inches in diameter. Interconnection between spars in this case is done in much the same manner just described above, except that an intermediate ten inch diameter spar splice tube 193 is coaxially inserted at the interface of the twelve inch spars, as indicated in FIG. 5B. Each of the twelve inch spars have two internal doughnuts which receive and grip the ten inch spar. The twelve inch spars each have a flange 195, which is bolted onto a corresponding flange of the neighboring spar. At the interface between the intermediate and wing-tip sections, a second spar splice tube is used to receive the 4½ inch spar of the wing-tip sections, and form the 6.5 degree dihedral.

In addition to the main spar 139, the aircraft 101 also mounts a water tank 197 and other elements in close proximity to the spar at the interface between sections, if a regenerative fuel cell embodiment is used. This is best illustrated in FIGS. 5B and 5C, where it is seen that each regenerative fuel cell 104 requires a combination fuel cell/electrolizer 199, a water tank 197, thermal insulation 201, and a set of pumps and valves 203 to control storage and discharge of the fuel cell. During sunlight hours, surplus current from the solar arrays is used to form hydrogen and oxygen gases from water. The gasses are produced at pressure, then stored in their respective tanks 191 within the main spar. At night, electricity from the gases is derived by the fuel cell 199, which allows the gases to recombine using proton exchange membranes. The sole by-product, water, is pumped into the water tank 197 and stored there for use in a subsequent energy storage cycle.

Spaced along the spar 139 in the wingspan dimension are large number of polystyrene ribs 167 which provide the primary fore-to-aft structural support for the wing 135. At the lateral ends of the five sections 121, 123, 125, 127 and 129, where their main spars attach to one another, the sections terminate in an end-box 177. Basically stated, the end box is a carbon fiber and KEVLER™ rib structure that prevents tension of the skin-material 205 from warping the end rib for any section. At the front of the wing, the leading edge 175 is also reinforced with a sheet 211 of one-quarter inch thick of polystyrene, to resist warping of the leading edge of the individual ribs 167 within the wing.

Figure 8A:
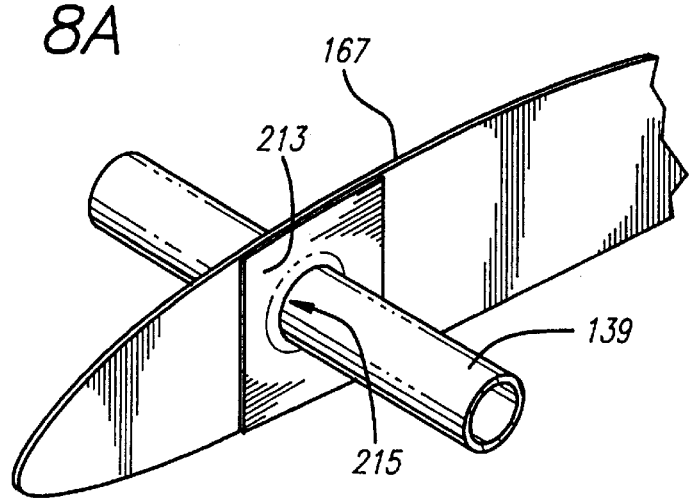
FIG. 8A shows a rib of the aircraft's wing, and its attachment to the main spar.
Figure 8B:
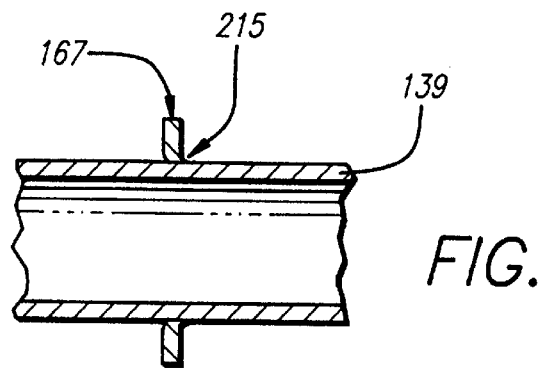
FIG. 8B shows attachment of the main spar to individual ribs of the aircraft wing.
Figure 8C:
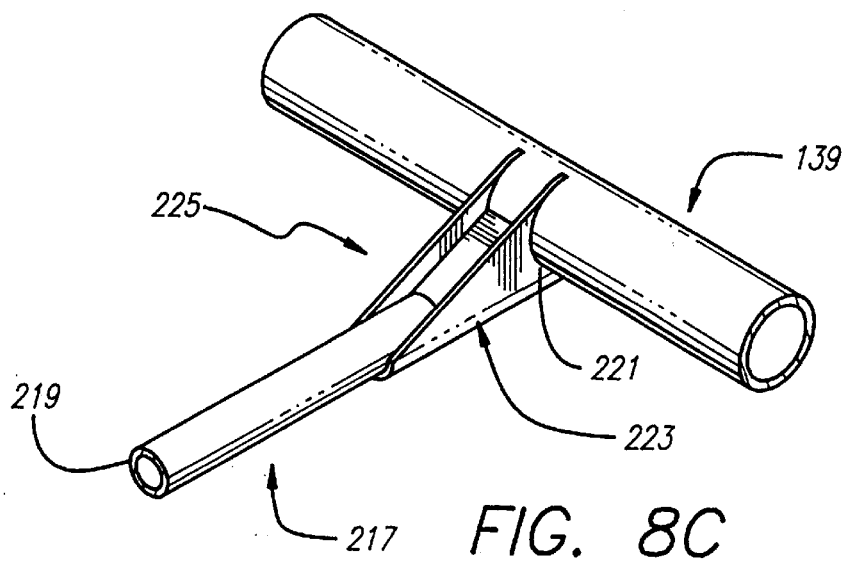
FIG. 8C shows attachment of a motor pylon lug, which mounts one of the electric engines, to the main spar.

As can be seen in FIGS. 8A–C, each rib 167 is a section of expanded polystyrene that is cut in the shape of the airfoil. Each rib is also wrapped with a reinforcing strip of fabric 213, at the points where the rib meets the spars 139 and 165. In particular, the rib is wrapped with 1.8 ounce-per-square yard KEVLAR™ cloth, with one ply applied to each side of the rib using an epoxy laminate. A hole 215 is then punched through this reinforced area nearly corresponding to the dimensions of the spar, but slightly undercut, to generate a tight fit between rib and spar. The spacing between adjacent ribs is approximately 20 inches, and so, approximately 120 ribs are used for an aircraft having 200 foot wingspan. As indicated in FIG. 8B, once the undersized hole has been punched through KEVLAR™ material, the spars are slid directly through a group of aligned ribs, with the KEVLAR™ conforming to the spars' surfaces.

FIG. 8C illustrates the attachment of a motor pylon lug 217 to the spar, which is needed to mount each one of the propeller engines 103. The pylon lug 217 is a 1¼ inch diameter graphite tube having one end 219 that mounts the propeller engine, and another 221 that connects to the main spar 139. At this second end, it has a foam fillet 223, covered with fiberglass, which helps provide added stability against movement or rotation in the pylon lug's connection to the spar. KEVLAR™ strands 225 are used to wrap the pylon lug snugly against spar, to firmly lock it against any movement or rotation. As seen in FIG. 5A, each of the motors has a carbon fiber motor pylon 225 which coaxially receives the pylon lug 217 within its hollow interior. Holes 227 in either side of the carbon fiber motor pylon match a bore 229 that pierces through the pylon lug, and they mutually receive a pin (not shown) that locks the two together. Accordingly, the propeller engine 103 is firmly pinned to the pylon lug 217 and prevents relative rotation or movement of the propeller engine 103 with respect to the aircraft. Connection of the propeller engine 103 to the aircraft is completed by electrically coupling the engine to the power bus 151 and the logic bus for the leading edge 175. As mentioned above, each propeller engine 103 has electronics, contained within a circuit board 231, which allows the engine to be addressed by the controller pod 143, return a engine heat sensor signal, and accept a PWM variable torque control signal.

Wrapped about the entire wing 135 (except the elevators) is a one-half mill thick layering 205 of TEDLAR™, which is high strength clear plastic, available from the DuPont Company. Other materials, such as MYLAR™ (also available from DuPont) have been considered for this task, but it has been found that TEDLAR™ is especially resistant to ultraviolet rays, and so, forms an ideal lightweight, high strength material for use at high altitude. For applications of the aircraft which do not involve prolonged high altitude flight, MYLAR™ or another polyester material is suitable for use as a skin material for the wing. Preferably, the skin material 205 is transparent since the solar arrays 115 are preferably two-sided, and can accept light which is incident upon the solar array through the downward facing surface of the wing. A silicone based adhesive is applied to the ribs to adhere the skin to the aircraft, and the material is subsequently heat-shrunk using hand-held heat jets.

Figure 9:
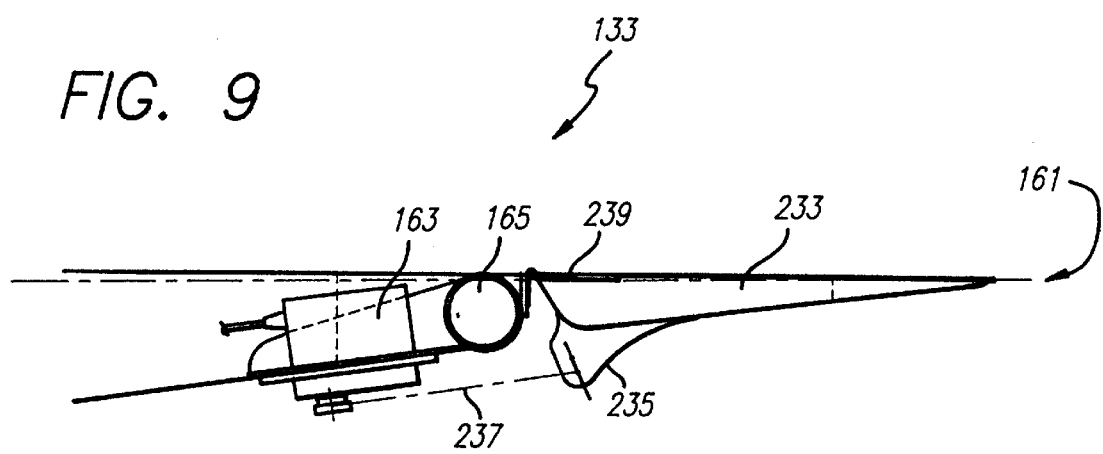
FIG. 9 shows an elevator of the wing of FIG. 3A.

FIG. 9 shows the elevator 133 of the wing in greater detail. As mentioned, each elevator is controlled by a 5 volt servo unit 163 that receives a PWM signal via a control line from the control pod 143. Preferably, each servo unit 163 includes digital electronics (not shown) that define a logical address, such that all of the servos may be addressed and controlled via a single electronics bus. Accordingly, the same control lines connect to all of the servos, but each servo must recognize its own address code in order to accept a command from the control pod. Electronics mounted at each servo unit are effective to hold a commanded elevator angle, until the control pod commands the elevator to a new angle. As indicated by FIG. 9, each elevator is made of solid white foam 233 and has a extended plywood horn 235 which lies below the elevator. This horn 235 is coupled to the servo via a push rod 237, which permits the servo to rotate the elevator up and down with respect to the wing. The elevator is attached to the wing by means of an aluminum and polymer hinge 239. The hinge is attached to the elevator using sheet metal screws and a thin sheet of balsa, while its other end is attached to the trailing edge spar 165 using strands of KEVLAR™.

The Propeller Engines

The motors 155 used in the propeller engines are designed for maximum efficiency, rather than control of heat. Accordingly, the engines are designed to provide the maximum propeller torque possible with the smallest weight and power input requirements, and use about 2 amps of current at peak operation.

The construction of each of the eight propeller engines 103 is indicated by FIG. 10. In particular, each engine has a brushless A.C. motor 105 that includes a rotor 241, single stator 243, and a number of Hall effect detectors (not shown in FIG. 10). The circuit board 231 is mounted at the back of the motor receives power and control signals from along the pylon lug. The circuit board 231 uses these signals to generate the variable-frequency alternating current supply that drives the particular motor. The motor 155 is mounted at the end of a number of standoffs 245 and has a number of external cooling fins 247 that jut directly into the atmosphere, without an intermediate housing.

The rotor 241 terminates in a propeller hub 249 as it leaves the motor in the direction of the propeller's nose cone 251. The propeller hub 249 is a split-cylinder that clamps onto the round root of the blade, thereby providing ground adjustability. Unlike other high altitude propeller aircraft, however, the preferred embodiment does not use a variable pitch propeller, which further contributes to the reliability of the craft and its simplicity of design. Once assembled to the main wing, the propeller engines add about five feet to the length of the aircraft, giving it a wingspan to length ratio that is greater than fifteen-to-one (200 feet in wingspan versus approximately 13 feet in length).

The Vertical Fins

Figure 3C:
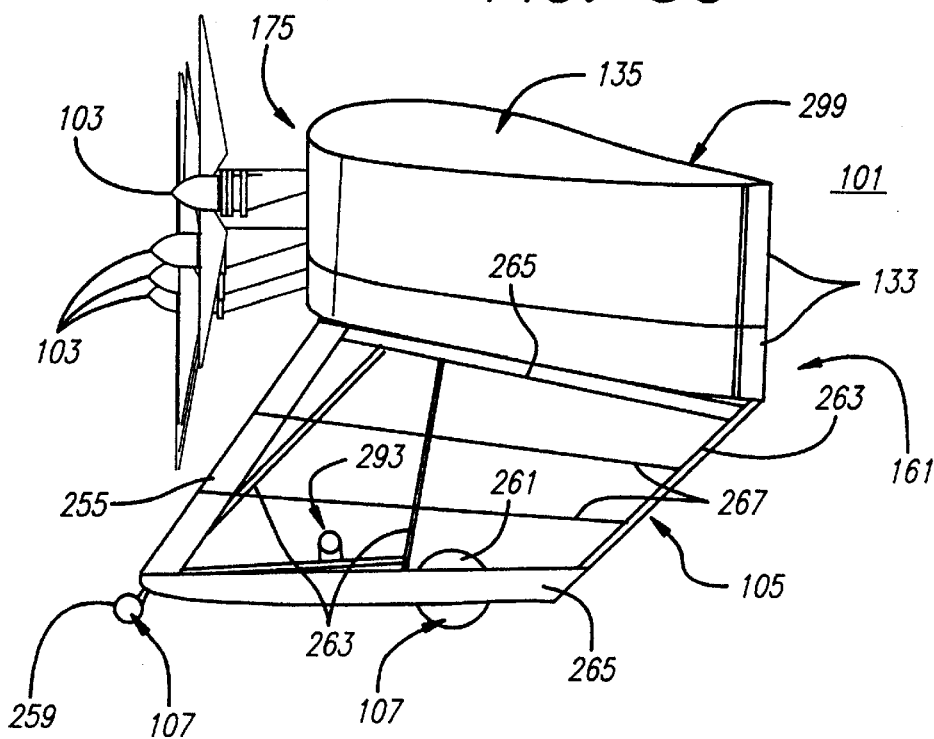
FIG. 3C is a side view of the aircraft of FIG. 3B, taken along lines C—C of FIG. 3B.
Figure 15:
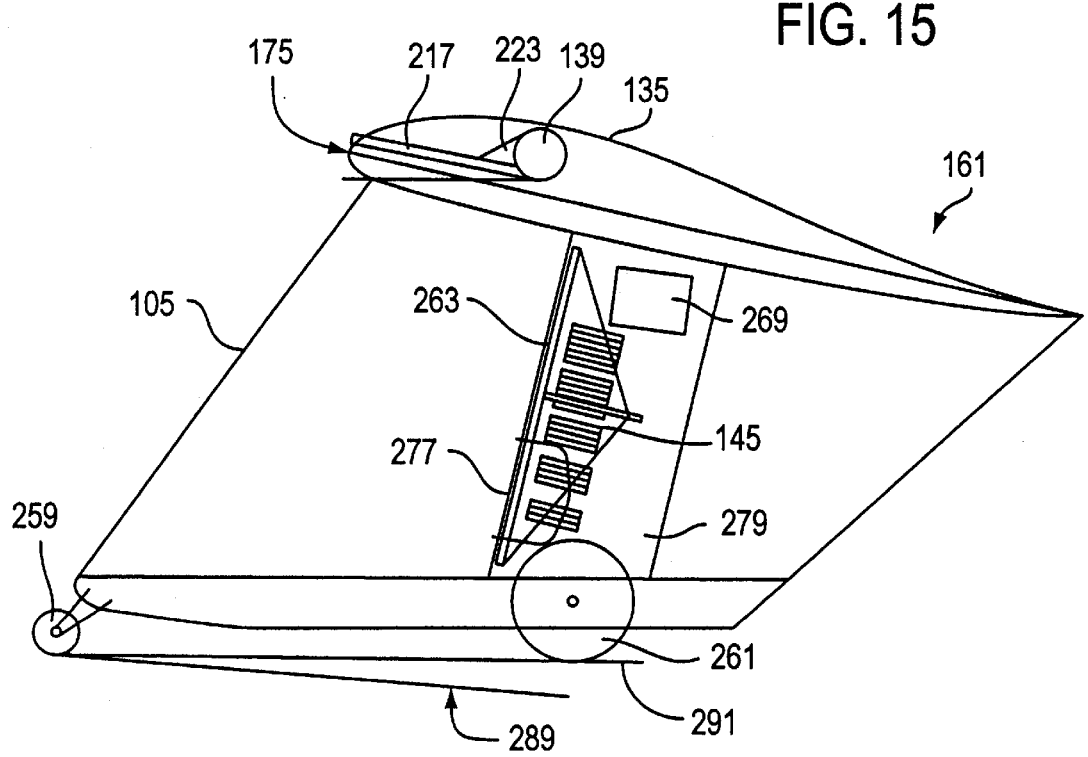
FIG. 15 is a cross-sectional view of the preferred aircraft, taken along lines 15—15 of FIG. 3B. The figure indicates the positioning of control electronics within one of the vertical fins of the aircraft, as well as locations of each of front and rear wheels of the aircraft landing gear, as mounted upon each vertical fin of the aircraft.

As best seen in FIG. 3C, the four vertical fins 105 of the aircraft are each formed by a framework of carbon tubes and polystyrene, the latter forming a leading edge 255 for the vertical fin. Despite the alternate use of the terms "fin" and "pod" in this description, both terms are used interchangeably to refer to the long vertical fins 105 which extend beneath the wing and support the aircraft when it is on the ground. The control electronics and conventional batteries are inside the fins. The fins are generally six-seven feet in height, though they are built at a slight angle, as seen in FIG. 15. They mount two wheels 259 and 261 of the landing gear in a manner that permits the front wheel 259 to always touch ground first, when the aircraft 101 descends at its natural angle of attack.

The fins 105 are constructed in much the same manner as described for the main, horizontally extending wing 135 of the aircraft. In particular, each fin (FIG. 3C) includes four main vertical structural members 263 and two horizontal main structural members 265, each being a carbon tube. In addition, three horizontal wooden ribs 267 are used to impart thickness and rigidity to the vertical surface, to help provide vertical stabilization to the aircraft. As mentioned earlier, this helps prevent unwanted sideslip and "dutch roll," which flying wings are naturally susceptible to. The avionics are all mounted on the inside of a composite sandwich shell. The shell provides structural support, aerodynamic fairing, thermal insulation, and also allows for protrusion of cooling fins into the ambient air stream.

As was the described with respect to the aircraft main wing, in connection with FIG. 8B, the ribs 267 are mounted upon the vertical structural members 263. Once control electronics and other material have been loaded onto the aircraft, the fins are wrapped with TEDLAR™ to insulate these sensitive elements against atmospheric effects. The fins are attached to the main wing in roughly the manner seen in FIG. 8C, that is, by securing the vertical structural members to the main spar 139 using strands of KEVLAR™.

The Power System

Figure 11:
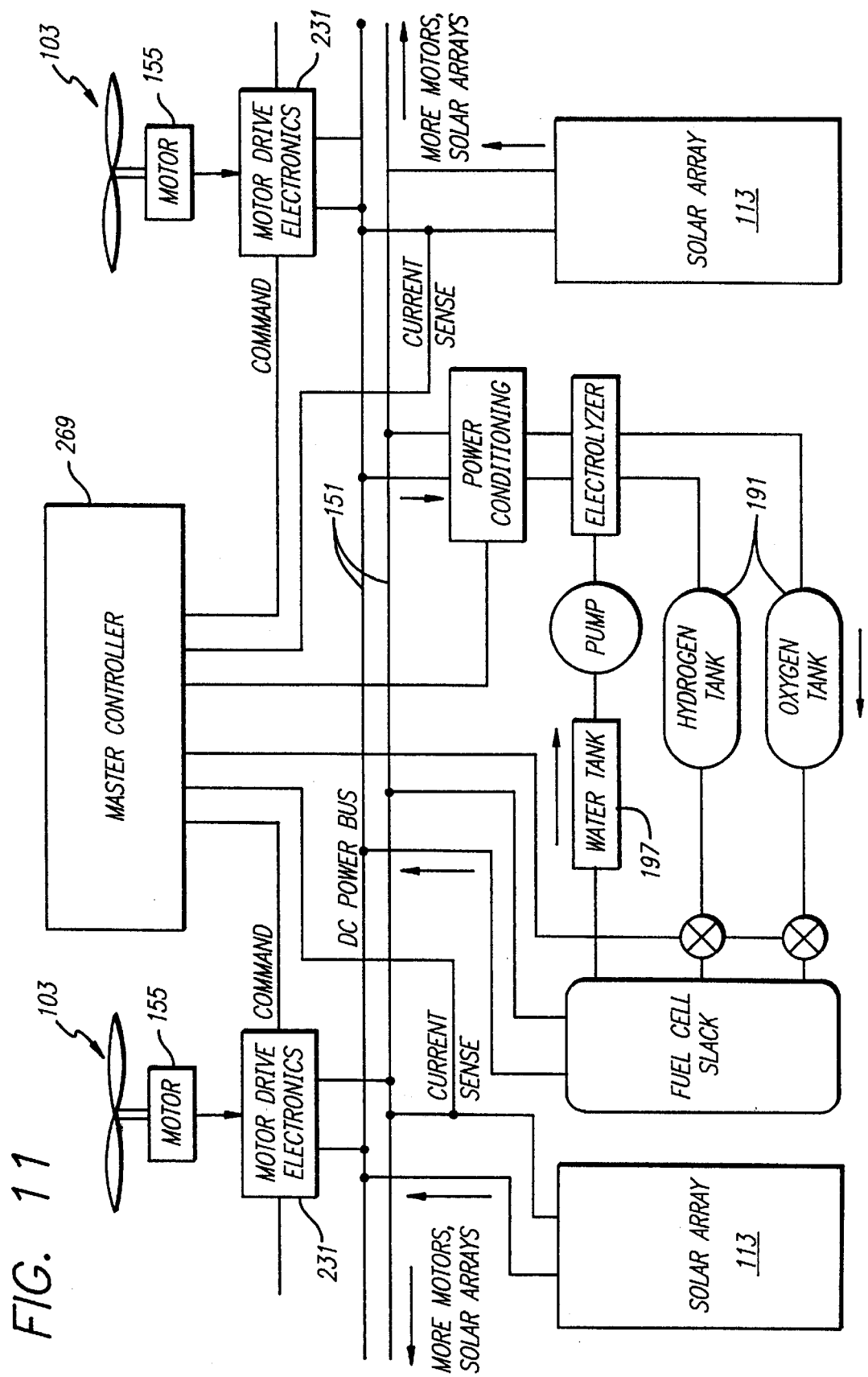
FIG. 11 is a power system diagram of the center section of an embodiment of the aircraft of FIG. 3A which uses a regenerative fuel cell. The figure shows two engines and their respective solar arrays, as well as a master controller that controls the engines and elevators of the aircraft.

FIG. 11 illustrates the power distribution scheme for the center section of the aircraft, in somewhat greater detail than is seen in FIG. 4. The power system includes the solar arrays 113, the power bus 151 that spans the wingspan "W" of the aircraft, and a master controller 269 that individually controls the eight propeller engines 103 and the main power supply. In addition, the power system includes five, twelve and twenty-eight volt power supplies 145 which are mounted in the control pod 143, as well as a power regulation system that governs the operation of the batteries. The particular power regulation scheme used will vary depending upon the aircraft's particular application, and its understanding is not considered crucial to the present invention. In the embodiment that uses regenerative fuel cells 104, power regulation does feature an added task of controlling the remixing of pressurized hydrogen and oxygen gases, which produces electric discharge. Therefore, at least part of the power regulation scheme optimally uses the master controller 269 to electronically regulate the flow of gases from their storage tanks, using electronically-controlled valves 203.

The Power Bus

The power bus 151 consists of a pair of high voltage insulated copper wires that couple all five of the solar arrays in parallel. The power requirements of these wires are such that it must be capable of handling 100–150 volts at a peak current of about 4–5 amps. As mentioned earlier, each propeller engine 103 is positioned adjacent to a solar array 113, and therefore, there is no central distribution point for the aircraft through which all power must pass. Each solar array, as seen below, consists of a large number of individual solar modules 271 which are coupled in series to generate the high voltage needed by the propeller engines.

The Solar Arrays

Figure 12A:
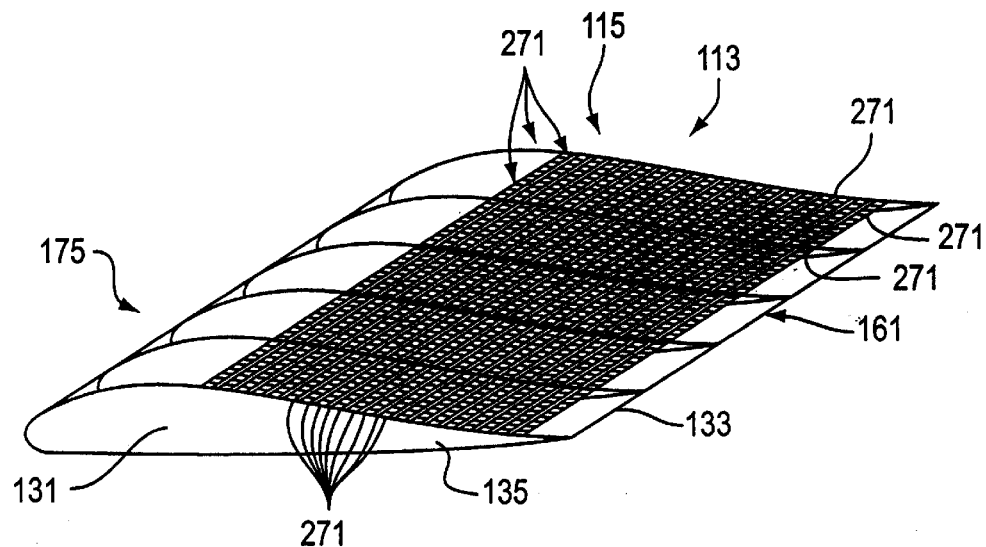
FIG. 12A is a perspective view of a section of the wing of the preferred aircraft, and illustrates the positioning of solar arrays upon an upward edge of the wing.
Figure 12B:
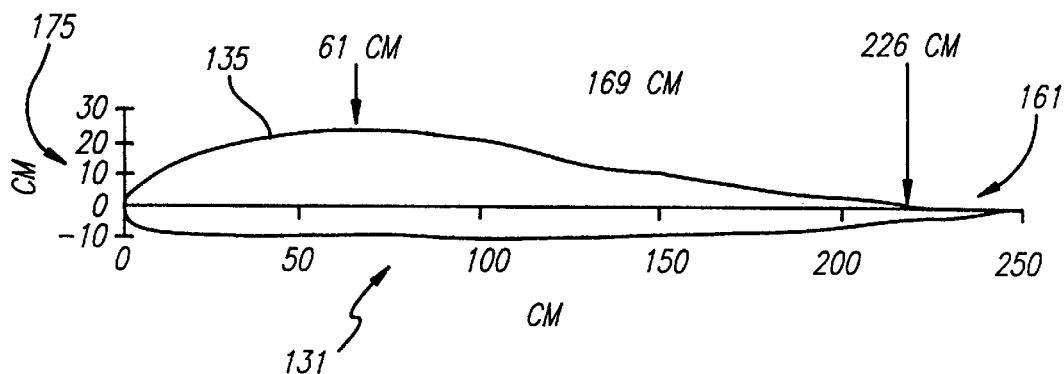
FIG. 12B is a cross-sectional side view of the wing of FIG. 12A and illustrates the cross-sectional shape of the wing, its relative dimensions, and a portion of the wing's surface area covered by the solar array.
Figures 1, 12C:
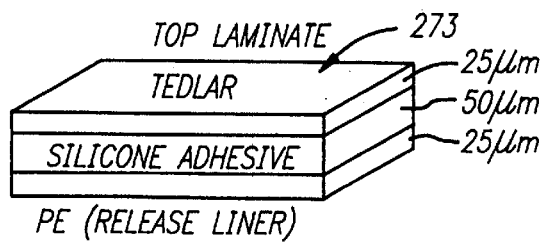
FIG. 12C is an illustrative view of the materials used to adhere and seal the solar arrays.
Figure 12C:
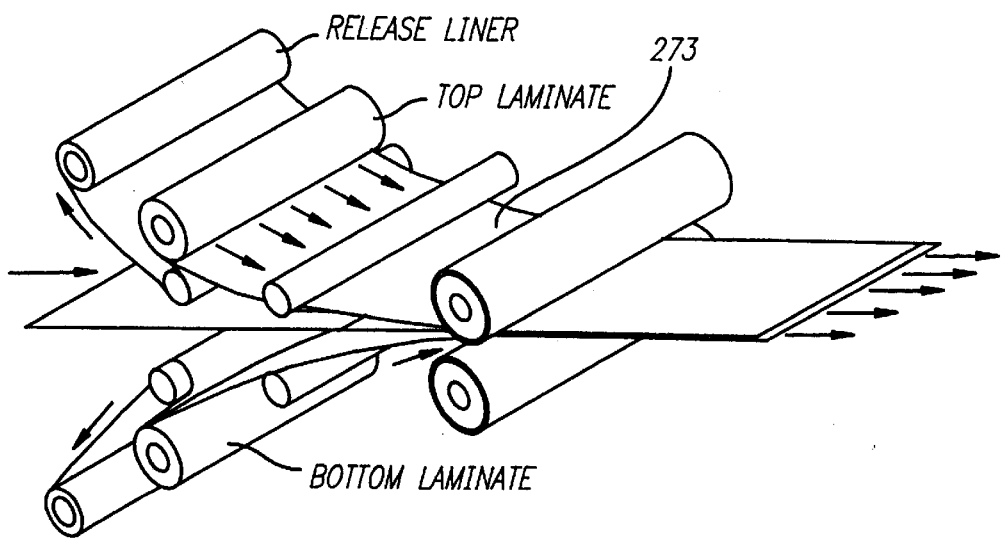
Figures 2, 12C:
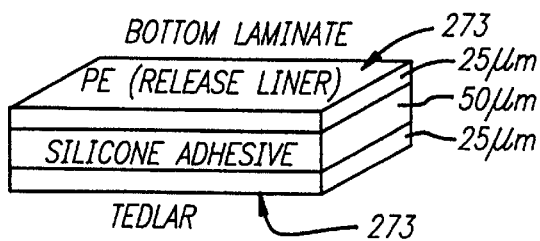
Figure 13:
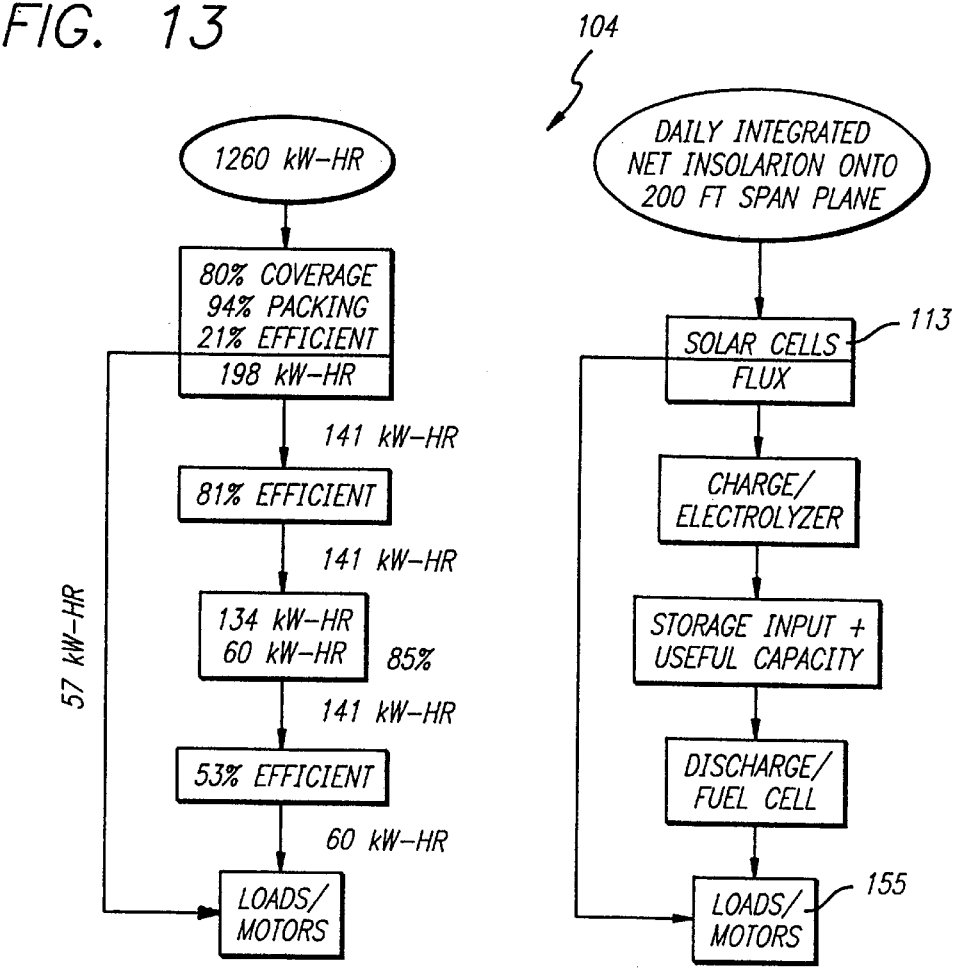
FIG. 13 is a block diagram that illustrates the cycle and efficiencies of the energy system of an aircraft that utilizes regenerative fuel cells to store electricity for the aircraft's use at night.
Figure 14:
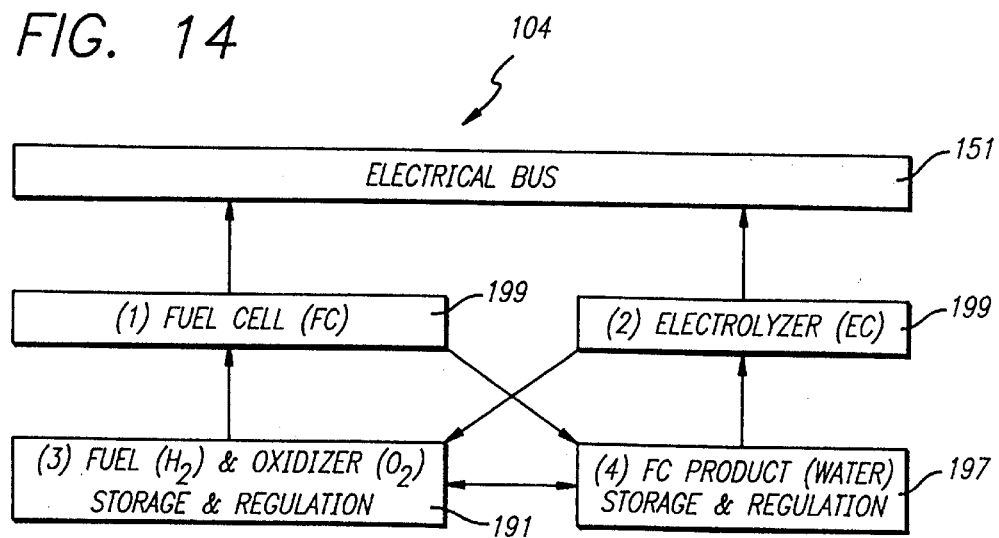
FIG. 14 is a block diagram that indicates the operation of the regenerative fuel cells.

FIGS. 12A–12C illustrate the configuration and assembly of the solar arrays 113 in greater detail, with FIG. 12A showing a prospective view of the wing 135 and the proportion of its upward surface 115 that is covered with the solar arrays. In particular, most of the upward surface 115 of the wing not forming a part of the leading edge 175 is tiled with individual, two-sided solar modules 271. As seen in FIG. 12B, the solar arrays 113 cover approximately 68% of the top surface of the wing, or about 169 centimeters of the wing's 250 centimeter length.

The application of the solar arrays 113 to the upward surface 115 of the wing is best discussed with reference to FIG. 12C. In particular, once individual modules 271 have been coupled together in to form an array that produces the desired voltage, they are laminated prior to their application to the upward surface 115 of the wing. As seen FIG. 12C, the solar arrays 113 are sandwiched between two layers 273 of TEDLAR™ fluoropolymer, made by Ausimont USA, Inc., using a silicon adhesive. The adhesives are applied by removing a release liner, which is simply rolled away from the adhesive as it is applied to the top or the bottom of the solar array.

Another layer of adhesive is then applied to the bottom laminate, and used to directly adhere the laminated solar array 113 to the upward surface 115 of the wing. As mentioned earlier, both of the upward and downward skin surfaces 203 of the wing are made of TEDLAR™, which is especially resistant to ultraviolet wear. The TEDLAR™, however, permits some light to fall incident on the bottom of the solar arrays.

A large number of companies make photovoltaic cells suitable for use on the preferred aircraft. The particular photovoltaic cell is selected to produce a peak power of about 1.25 watts at one half volt. Suitable two-sided cells are presently made by the SunPower Company and by Siemans Corporation, with the latter company making the preferred modules at the present time. It is expected that as solar cells become more efficient, the particular configuration of solar cells just described will be changed to make use of current technology.

The Energy Storage System and Battery Pods

As alluded to previously, the energy storage system 119 can either be a regenerative fuel cell 104 or a standard rechargeable battery 275, such as a rechargeable battery. The relative configurations of these systems is respectfully illustrated by a comparison of FIG. 11 with FIGS. 4. The latter figure illustrates the mounting of individual batteries 275 within each vertical fin of the aircraft. This embodiment is preferred for use, for example, where the aircraft's night duty is short. For example, as mentioned above, in a hypothetical application where the solar rechargeable aircraft 101 is called upon to provide summer duty as a radio relay over one of the great lakes, rechargeable batteries are the most practical, since they impose the least weight requirements on the aircraft. On the other hand, since the water regenerative fuel cell 104 provides greater electrical storage capacity, it is preferred for use in conditions where nights are longer and the additional weight can be tolerated.

As described earlier, the regenerative fuel cell 104 requires use of a combination fuel cell/electrolizer, pumps and compressors, a water tank and regulating valves, all of which are mounted in the upper portion of each of the battery pods 117, within the wing (FIGS. 5B and 5C).

Selection of particular batteries to be used and the number of batteries varies with the particular application, and is well within the skill of one familiar with battery and power supply applications.

The Control Pod

The layout of the control pod 143 is indicated in FIGS. 5C and 15. All avoinics systems are mounted to aluminum cooling plates which are attached to the inside of the previously-mentioned composite shell.

Figure 16A:
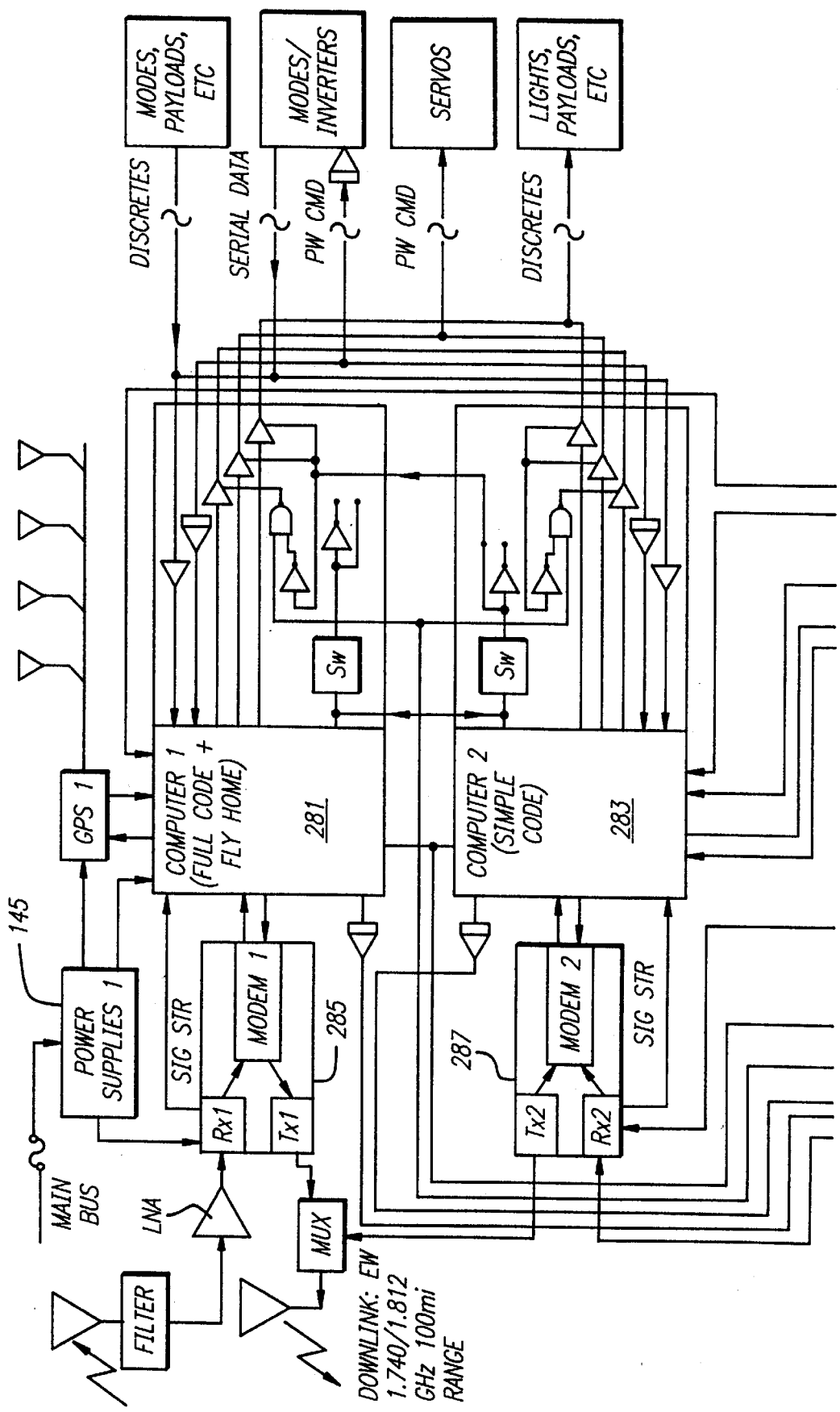
FIG. 16 is a block diagram of the control electronics of the preferred aircraft.
Figure 16B:
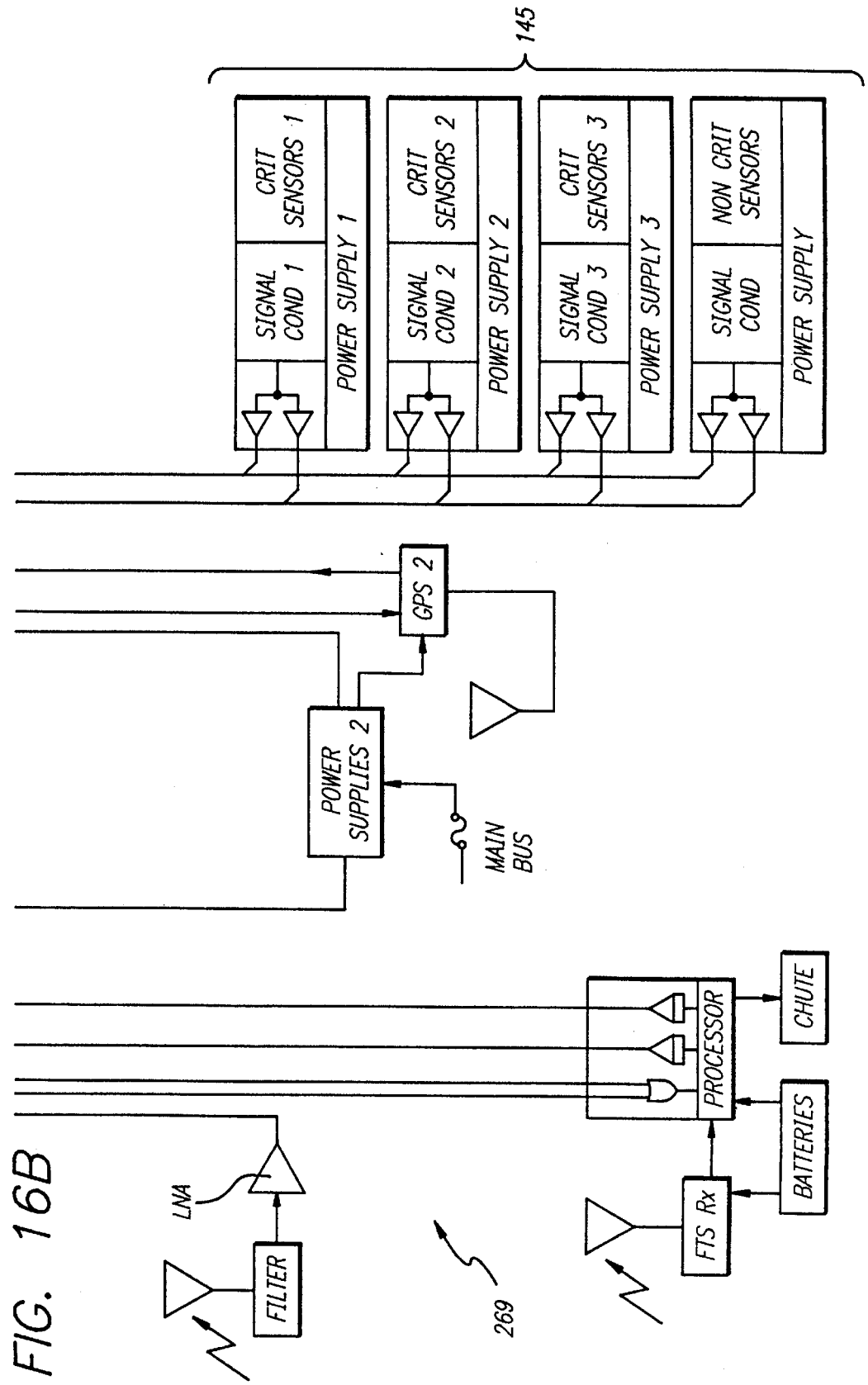

The layout and operation of the master controller 269 is indicated in greater detail in FIG. 16. As stated earlier, the a number of redundant devices are used by the master controller to heighten the reliability of the aircraft. To this effect, the master controller actually includes two redundant computer systems 281 and 283, one of which is used as a main computer, the second of which is used as a back-up computer. Both computers 281 and 283 have a full set of operations code that is specially directed to the aircraft's desired mission. The master controller 269 also features two redundant transceivers 285 and 287, which are primary used as a main transceiver and a backup. These transceivers are used to transmit surveillance information (e.g., image data) transmitted to a ground station by the main computer, as well as receive operational commands, such as elevation, speed, direction, flight plan, etc. The computers 281 and 283 are connected by a master switch, which monitors computer status and automatically switches to the other computer and its dedicated transceiver in the event of a sensed failure.

Selection of a suitable control program for aircraft avionics is within the skill of an ordinary computer programmer familiar with such programs, and will vary with the particular application that the aircraft is called upon to perform.

The Landing Gear

The preferred aircraft is built to not need a flare mode at landing. Due to its light weight, flexibility, and overall configuration, the aircraft is preferably landed nose first. That is to say, many winged aircraft require pitch up just prior to landing to enable rear landing gear wheels to touch down first. The present aircraft, however, departs from this conventional wisdom. To this effect, the aircraft's landing gear 107 includes sets of two wheels 259 and 261 which are mounted at the bottom of each vertical fin or pod 105. These wheels 259 and 261 are spaced apart along the direction of travel of the aircraft and are mounted (relative to the aircraft's natural angle of attack 289) such that the front wheel 259 is held lower than the back wheel 261. In other words, as the aircraft 101 flies on a level or descends naturally, the front wheel 259 hits ground first. In this manner, the aircraft does not require sophisticated control upon landing. The aircraft 101 is sufficiently light that the front wheel 259 will not cause the aircraft to bounce upon landing.

This construction is easily seen in FIG. 15, which illustrates the configuration of the pod for the rechargeable battery and control electronics. A normal angle of attack for the aircraft is illustrated as a level line 289 seen in those figures. A second line 291, connecting the two wheels, indicates the inclination of this angle of attack with respect to ground.

Payload and Other Equipment

In general, the payload and electronic accessories carried by the aircraft will be carried by the control pod 143. One exception to this general rule is observed with reference to FIG. 3C, where it is seen that a video camera 293 is carried by one of the outer battery pods of the aircraft. This is done in the particular embodiment indicated, because it was desired to afford the video camera a wide lateral view without the interference of nearby pods. Other types of equipment that could be mounted in the same manner as a video camera include light detectors, spectral analysis equipment, infrared detectors, additional transceivers if the aircraft is used as a communications relay, doppler wave devices for use in atmospheric analysis, as well as a wide range of other devices. In general, however, the mounting of such equipment in the control pod 143 is preferred, as this will reduce wiring requirements of the aircraft, and thus weight.

Aerodynamics of the Aircraft

The present aircraft 101 is preferably designed to have the capability of permanent self-sustained flight, at least until its parts wear out. To best achieve this using current technology, the weight of the aircraft is minimized in order to minimize the amount of electricity needed by the propellers and provide the most efficient flight possible.

However, in achieving these objectives, the solar rechargeable aircraft is not designed to battle high winds or turbulence. Consequently, the desired flight conditions of the aircraft are not unlike that of a hot air balloon. That is to say, the aircraft is best launched when surface winds are low, preferably under 5 knots in speed. Similarly, to reach high altitudes, the aircraft is preferably kept below the jet stream until conditions are optimal for the aircraft to "punch-through" the jet stream. Finally, since airplanes need to fly faster at higher elevations (to produce lift), the solar rechargeable aircraft is designed to store enough energy daily to maintain a constant flight speed overnight, and hence fly at a constant altitude overnight. In this manner, the aircraft may make optimal use altitude changes to take advantage of wind direction and speed at different altitudes. The aircraft can thereby be faster moved to a desired geographic location, much faster than its maximum air speed would indicate. Otherwise stated, if the aircraft could not fully drive its engines at night, it would have a lower maximum altitude at night, and could not take advantage of a full range of winds within its operational ceiling. Staying high also means the aircraft stays above most clouds twenty-four hours a day.

The Effect of Altitude

The present aircraft has a relative air speed that normally varies between 15 miles per hour to 90 per hour, dependent upon the aircraft's altitude. As mentioned previously, due to the thinning of the atmosphere, a winged aircraft has to fly faster to maintain the same amount of lift as its elevation increases. The preferred aircraft requires approximately 15 miles per hour velocity to achieve liftoff, whereas it must fly with a relative air speed of about 90 miles per hour to maintain its lift at 65,000 feet altitude. It is this altitude that is the aircraft's maintainable ceiling, meaning that the aircraft can normally sustain this altitude both night and day. During optimal daylight conditions, it is expected that the aircraft can temporarily attain an altitude of nearly 90,000 feet, but cannot sustain that altitude throughout the night.

The Effect of Latitude

The preferred aircraft obviously requires sunlight a significant portion of the day to operate. The amount of power generated by the aircraft is directly dependent upon its latitude and the time of year. For example, if the aircraft is flying north of the arctic circle, it will have continuous access to sunlight during the summer months and virtually no sunlight during the winter months. In addition, the more extreme the aircraft's position in terms of north and south, the lower the angle of incidence sunlight will have with respect to the aircraft's wing. One might expect that this would reduce the aircraft's available power, but at least during the summer months, it does not, since the nights are short at such latitudes and the aircraft has an ample supply of light. With such conditions, as mentioned above, a conventional battery system is optimally used to supply back-up power. In these extreme regions, such within the arctic circle, the 65,000 foot maintainable ceiling of the aircraft remains constant throughout the summer, but falls off drastically during the months of March and October, quickly reaching zero. As alluded to above, the aircraft needs to fly faster at higher elevations, and accordingly, as its power requirements increase, the aircraft's sustainable ceiling decreases.

In other words, in the polar regions, there is so little sunlight from mid-fall to mid-spring that the aircraft is incapable of flight these regions during this period. By contrast, as the aircraft's operating latitude changes, the aircraft becomes increasingly capable of at flight during winter months, but with a reduced ceiling. For example, the aircraft is capable of sustaining its desired 65,000 operating altitude at 35° latitude, even during the winter months.

Navigation

Within the 15–100 miles per hour airspeed range of the aircraft lies its aileron reversal velocity, that is, an effect varying for each aircraft where the effect of the trailing edge flaps used as ailerons reverses. Many aircraft have flaps on both of their left and right wings. When these flaps are driven in opposite rotational directions, i.e., one up and one down, to inhibit or cause roll of the aircraft, the flaps are operating as "ailerons." Flaps which are capable both of use in the same and also directly opposite rotational directions are also called "elevons." At slow speeds, the use of an aircraft's flap to pivot in the upwards or downwards directions with respect to the wing reduces or increases lift on the wing, respectively. By contrast, as the airspeed increases, the effect of flap reverses, such that pivot of the flap in the upward or downward direction imparts an upward or downward pitch to the wing, respectively. This concept of aileron reversal velocity, related to the velocity and amount of lift of the aircraft wing, bears somewhat on the present discussion.

As the aircraft is called upon to turn using differential thrust of the eight propeller engines 103, the side of the aircraft that is being propelled faster experiences an increase in lift. However, the tendency of that side of the aircraft to lift is counteracted by a decrease in its air speed as that side of the aircraft encounters increase resistance on its downward surface. As a result, lifting tendency of the propelled side of the aircraft is counteracted. The increased propulsion also creates tendencies for the aircraft to experience an oscillating roll, known as "dutch roll," or to experience unwanted sideslip of the aircraft, without turning. To this effect, each of the vertical fins 105, or pods of the aircraft, act as a vertical stabilizer that neutralizes these tendencies. The result is that the aircraft is turned without the use of a rudder or ailerons, albeit a very large turn radius is required, possibly as large as one mile, depending on altitude and atmospheric conditions.

Descent and Landing

The solar arrays 113 help balance the flying wing to enable it to provide a stable flight structure. Without these solar arrays, the wing would have a severe forward pitch that might render the preferred structure of the aircraft unstable. As a point of fact, however, the preferred structure is balanced such that the aircraft's center of gravity falls 295 (FIG. 6B) between twenty-two and twenty-four percent of the wing's length behind the leading edge 175 of the wing. By contrast, the aerodynamic center 297 is between twenty-five and twenty-six percent of the wing's length away from the leading edge (as is the main spar 139). These considerations combine to create a slight nose-down pitching moment for the aircraft. With reference to FIGS. 3C and 6B, it is seen that the preferred wing has a slight upward flare 299, or reflex, at the trailing edge. The effect of this flare 299 is to provide a counteracting pitch, which offsets the forward pitch of the wing. Accordingly, even when the aircraft is not under power, the aircraft will only pitch slightly forward in flight, and generate a neutral angle of descent that the aircraft will follow until it lands in stable manner.

Thus, the preferred aircraft is an odd flier; it is capable of flying indefinitely, and it doesn't need to refuel. It turns only by differential thrust, and its 20+ elevators 133 are driven in a common rotational direction by the master controller 269. Thus, the aircraft doesn't use ailerons, but it turns in a slow, stable manner, requiring as much as a mile of turning radius under some circumstances. Despite these seeming limitations, the aircraft is utterly pollution-less, and holds some significant advantages over combustion-powered aircraft for numerous applications, such as radio relay.

Having thus described an exemplary embodiment of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

We claim:

1. An aircraft having a wingspan dimension that is perpendicular to a direction of travel of the aircraft, a length dimension that is parallel to the direction of travel, and a front direction defined by the direction of travel said aircraft comprising:

a wing extending generally perpendicular to the direction of travel and defining the wingspan; and a landing gear having wheels positioned at different locations along the length dimension of the aircraft, the landing gear having a main gear and a front-most gear, wherein all of the wheels are mounted by the wing;

wherein the wing's angle of attack is configured such that the main gear lifts off prior to the front-most gear during take-off.

2. An aircraft according to claim 1, and further comprising:

at least two aircraft engines mounted at different positions along the wing, the aircraft engines propelling the aircraft; and a controller that turns the aircraft in yaw;

wherein the aircraft is free of a rudder and free of ailerons; and wherein the aircraft turns in yaw by causing differential thrust to be applied to the engines, free of using ailerons or a rudder.

3. An aircraft according to claim 2, further comprising:

at least two elevator flaps mounted by the wing; and a controller that drives all of the elevator flaps to rotate in a common direction, such that the aircraft is free of the use of ailerons.

4. An aircraft according to claim 2, wherein:

the aircraft has a maximum length; and the wingspan is at least four times the maximum length of the aircraft.

5. An aircraft according to claim 4, wherein the wingspan is greater than seven times the maximum length of the aircraft.

6. An aircraft according to claim 2, wherein the wing is configured to include dihedral during flight for providing roll stability.

7. An aircraft according to claim 2, wherein the aircraft is substantially free of a fuselage.

8. An aircraft according to claim 2, wherein the aircraft has a distribution of weight at all stages of flight and normal loading such that no ten percent portion of the aircraft's weight along the wingspan dimension weighs more than thirty percent of the total weight of the aircraft.

9. An aircraft according to claim 2, wherein:

there are at least two fins that are spaced along the wingspan of the aircraft; and said aircraft has a weight associated with it, no more than fifty percent of the weight of the aircraft being distributed within any twenty percent portion of the wingspan.

10. An aircraft according to claim 2, having a center of gravity, wherein:

the wing defines an aerodynamic center;

the wing includes at least two substantially horizontal elevator flaps;

the aerodynamic center lies behind the center of gravity to create a nose-down pitching moment; and the aircraft is free of a tail structure.

11. An aircraft according to claim 10, wherein:

the wing is configured to include dihedral during flight for providing roll stability; and the wing is un-swept.

12. An aircraft according to claim 10, wherein the aircraft is substantially free of a fuselage.

13. An aircraft according to claim 2, wherein the aircraft does not include active roll control mechanisms, and the configuration provides passive roll control.

14. An aircraft according to claim 1, consisting essentially of a single wing free of a rudder, said aircraft further comprising:

at least three sections connected serially together to form the wing, the wing having a main spar that forms the principal structural member along the wingspan; and wherein each section includes an airfoil and an aircraft engine, each section independently producing sufficient lift to support its own weight during flight.

15. An aircraft according to claim 14, wherein the aircraft has a distribution of weight at all stages of flight and normal loading such that no ten percent portion of the aircraft's weight along the wingspan dimension weighs more than thirty percent of the total weight of the aircraft.

16. An aircraft according to claim 14, wherein the main spar provides the primary structural connection between the sections.

17. An aircraft according to claim 14, wherein:

the aircraft has a maximum length; and the wingspan is at least four times the maximum length of the aircraft.

18. An aircraft according to claim 14, and further comprising:

a photovoltaic array that covers at least forty percent of an upward surface of the wing, the photovoltaic array overlying the main spar substantially across the entire wingspan;

wherein the aircraft has a maximum length; and wherein the wingspan is at least three times the maximum length of the aircraft.

19. An aircraft according to claim 14, wherein:

there are at least two fins that are spaced along the wingspan of the aircraft; and said aircraft has a weight associated with it, no more than fifty percent of the weight of the aircraft being distributed within any twenty percent portion of the wingspan.

20. An aircraft according to claim 14, wherein:

each section includes a photovoltaic array mounted by the section, that receives sunlight and converts the sunlight to electricity, and each engine of the aircraft is an electric engine, and receives substantially all of its driving electricity from the photovoltaic array of the section that mounts it, and is not dependent upon a different section for a source of electricity.

21. An aircraft according to claim 20, wherein:

the aircraft has a maximum length; and the wingspan is at least four times the maximum length of the aircraft.

22. An aircraft according to claim 20, wherein the aircraft has a distribution of weight at all stages of flight and normal loading such that no ten percent portion of the aircraft's weight along the wingspan dimension weighs more than thirty percent of the total weight of the aircraft.

23. An aircraft according to claim 1, having a wingspan that is at least four times a maximum length of the aircraft, wherein:

the wing is formed of at least two individual sections connected together along the wingspan, each section including an airfoil, a photovoltaic array mounted by the section, that receives sunlight and converts the sunlight to electricity, and an electric engine mounted by the section, that receives driving electricity from the photovoltaic array and propels the aircraft by causing the airfoil to move through air and generate lift; and each electric engine of the aircraft receives substantially all of its driving electricity from the photovoltaic array of the section that mounts it, and is not dependent upon a different section for a source of electricity.

24. An aircraft, according to claim 23, wherein:

the wing has a main structural member along the wingspan direction, the main structural member having a hollow region within itself;

the wing further includes at least one regenerative fuel cell borne by the aircraft, the at least one regenerative fuel cell storing and generating electricity for use by the aircraft;

the at least one regenerative fuel cell operates by dissociating a chemical substance into components of the substance and recombining the components to reform the chemical substance; and the hollow region of the main structural member of the wing forms a tank that stores at least one of the chemical substance and one of the components.

25. An aircraft according to claim 24, wherein:

each section's photovoltaic array comprises a sufficiently large number of photovoltaic cells to produce from one day's sunlight electricity that drives that section's engines in sustained flight for twenty-four hours;

the photovoltaic cells supply electricity to both of the aircraft engines and the at least one regenerative fuel cell; and the at least one regenerative fuel cell stores sufficient electricity during daylight to drive the aircraft engines in sustained flight during nighttime.

26. An aircraft according to claim 24, wherein the at least one regenerative fuel cell utilizes a combination of hydrogen gas and oxygen gas and electrolysis of water.

27. An aircraft according to claim 24, wherein:

each section's photovoltaic array produces sufficient electricity from sunlight during one day's light to power the each section's engines overnight;

the at least one regenerative fuel cell has sufficient storage capacity to store electricity during daylight hours to entirely drive the electric engines overnight with the stored electricity; and each section is self sufficient in terms of generated and stored power necessary to drive each electric engine that it mounts.

28. An aircraft according to claim 24, wherein the aircraft includes at least four engines, each engine obtaining electric power from a photovoltaic array location proximate to the engine, and wherein the aircraft is free from a centralized point of distribution through which a plurality of the engines must obtain the energy used to drive them.

29. An aircraft according to claim 24, wherein:
the wing member has
an upward surface and a downward surface that combine to create lift, and
the photovoltaic array is mounted on the upward surface of the wing member, the photovoltaic array spanning a substantial portion of the wingspan;
the structural member extends along the wingspan and is positioned relatively closer to the photovoltaic array and the upward surface than to the downward surface, and limits the amount of flex of the wing; and
the structural member defines the cross-sectional point of least flex of the wing, and the photovoltaic array is mounted proximate to the structural member thereby minimizing compression and tension of the photovoltaic array.

30. An aircraft according to claim 29, wherein the photovoltaic array covers at least forty percent of the upward surface of the wing, the photovoltaic array overlying the main spar substantially across the entire wingspan.

31. An aircraft according to claim 29, wherein:
each section's photovoltaic array produces sufficient electricity from sunlight during one day's light to power the each section's engines overnight;
the at least one regenerative fuel cell has sufficient storage capacity to store electricity during daylight hours to entirely drive the electric engines overnight with the stored electricity; and
each section is self sufficient in terms of generated and stored power necessary to drive each electric engine that it mounts.

32. An aircraft according to claim 23, wherein:
a regenerative fuel cell stores electricity generated by at least one section's photovoltaic array for supply to at least one engine in that section.

33. An aircraft according to claim 23, wherein the aircraft is free from a centralized point of distribution through which a plurality of the engines must obtain the energy used to drive them.

34. An aircraft according to claim 23, wherein the wing includes a main spar that provides the primary structural connection between the sections.

35. An aircraft according to claim 23, wherein the aircraft has a distribution of weight at all stages of flight and normal loading such that no ten percent portion of the aircraft's weight along the wingspan dimension weighs more than thirty percent of the total weight of the aircraft.

36. An aircraft according to claim 23, wherein:
there are at least two fins that are spaced along the wingspan of the aircraft; and
said aircraft has a weight associated with it, no more than fifty percent of the weight of the aircraft being distributed within any twenty percent portion of the wingspan.

37. An aircraft according to claim 1, wherein the landing gear includes at least four sets of wheels that are positioned at different locations along the wingspan dimension of the aircraft.

38. An aircraft according to claim 1, wherein the aircraft is substantially free of a fuselage.

39. An aircraft according to claim 1, the aircraft being substantially free of a fuselage along the length dimension, comprising:

a plurality of aircraft engines that overhang the wing, in front of it; and
a plurality of fins that extend vertically downward from the wing at locations distributed along the wingspan, the fins each having a vertical length that is at least fifty percent of a length of the aircraft;
wherein the wing is substantially un-swept;
wherein the landing gear includes two wheels mounted at the base of each fin, away from the wing along the vertical direction; and
wherein the wheels at each fin are separated along the direction of travel and are oriented with respect to one another such that upon a natural descent of the aircraft, the wheel that is most forward along the direction of travel always touches ground first.

40. An aircraft according to claim 39, wherein said aircraft is free of a rudder.

41. An aircraft according to claim 1, the wing having an upward surface and a downward surface that combine to create lift, wherein the upward surface and the downward surface each include a material that is transparent to light; and further comprising a photovoltaic array mounted on the wing member, wherein the photovoltaic array includes a two-sided photovoltaic array mounted proximate to the material that is transparent to light of both the upward and downward surfaces, the material permitting light incident upon the upward surface and the downward surface to both be incident upon, and converted to electricity by, the two-sided photovoltaic array.

42. An aircraft according to claim 41, wherein:
electricity is the only fuel driving at least one aircraft engine.

43. An aircraft according to claim 41, wherein:
the aircraft further comprises energy storage cells;
the aircraft includes a sufficiently large number of the photovoltaic cells to produce from one day's sunlight electricity that drives the aircraft engines in sustained flight for twenty-four hours;
the photovoltaic cells supply electricity to the aircraft engines and energy storage cells; and
the energy storage cells store sufficient electricity during daylight to drive the aircraft engines in sustained flight during nighttime.

44. An aircraft according to claim 41, wherein:
the aircraft has a maximum length associated with it measured along a direction of travel;
the wingspan is at least three times the maximum length;
the photovoltaic array covers at least forty percent of the upward surface of the wing, the photovoltaic array overlying a main spar substantially across the entire wingspan.

45. An aircraft according to claim 41, wherein:
the photovoltaic array spans a substantial portion of the wingspan; and
a structural member extends along the wingspan, positioned relatively closer to the photovoltaic array and the upward surface than to the downward surface, thereby minimizing compression and tension of the photovoltaic array.

46. An aircraft according to claim 45, wherein:
the aircraft has a maximum length associated with it measured along a direction of travel;
the wingspan is at least three times the maximum length;
the photovoltaic array covers at least forty percent of the upward surface of the wing, the photovoltaic array overlying the structural member substantially across the entire wingspan.

47. An aircraft according to claim 45, wherein:

the aircraft includes a battery that is coupled to the photovoltaic array;

the aircraft includes a at least one engine;

the photovoltaic array produces sufficient electricity from sunlight during one day's light to power the at least one engine overnight; and the battery has sufficient storage capacity to store electricity during daylight hours to entirely drive the at least one engine overnight with the stored electricity.

48. An aircraft according to claim 14, wherein the wing is of substantially constant cross-sectional shape and area along the wingspan.

49. An aircraft according to claim 14, wherein the wing is substantially un-swept.

50. An aircraft according to claim 23, wherein the aircraft is substantially free of a fuselage.

51. An aircraft according to claim 17, wherein the wingspan is greater than seven times the maximum length of the aircraft.

52. An aircraft wing, comprising:

a substantially horizontal wing member that defines an aircraft wingspan, the wing member having
   an upward surface and a downward surface that combine to create lift, and
   a photovoltaic array mounted on the upward surface of the wing member, the photovoltaic array spanning a substantial portion of the wingspan; and a structural member extending along the wingspan and positioned relatively closer to the photovoltaic array and the upward surface than to the downward surface, thereby minimizing compression and tension of the photovoltaic array;

wherein the structural member has a hollow region within itself;

wherein the aircraft includes at least one engine that propels the aircraft by causing the wing to generate lift;

wherein the wing further includes at least one regenerative fuel cell borne by the aircraft, the at least one regenerative fuel cell storing and generating electricity for use by the aircraft;

wherein the at least one regenerative fuel cell operates by dissociating a chemical substance into components of the substance and recombining the components to reform the chemical substance;

wherein the hollow region of the structural member of the wing forms a tank that stores at least one of the chemical substance and one of the components;

wherein the upward surface and the downward surface each include a material that is transparent to light; and wherein the photovoltaic array includes a two-sided photovoltaic array mounted proximate to the material that is transparent to light of both the upward and downward surfaces, the material permitting light incident upon the upward surface and the downward surface to both be incident upon, and converted to electricity by, the two-sided photovoltaic array.

53. An aircraft wing according to claim 52, wherein the structural member defines the cross-sectional point of least flex of the wing, and the point of least flex is relatively closer to the solar array than to the lower surface.

54. An aircraft according to claim 52, further comprising energy storage cells that are coupled to the photovoltaic cells to receive and store energy converted from sunlight.

55. An aircraft according to claim 52, wherein:

said aircraft has a maximum length associated with it measured along a direction of travel;

the wingspan is at least three times the maximum length;

the structural member is a main spar that extends substantially across the entire wingspan; and the photovoltaic array covers at least forty percent of the upward surface of the wing, the photovoltaic array overlying the main spar substantially across the entire wingspan.

56. An aircraft according to claim 52, wherein:

the wing is formed of at least two individual sections connected together along the wingspan, each section including a portion of the photovoltaic array mounted by the section, and an electric engine mounted by the section, that receives driving electricity from the photovoltaic array and propels the aircraft by causing the airfoil to move through air and generate lift;

each section's photovoltaic array produces sufficient electricity from sunlight during one day's light to power that section's engines overnight;

the at least one regenerative fuel cell has sufficient storage capacity to store electricity during daylight hours to entirely drive the electric engines overnight with the stored electricity; and each section is self sufficient in terms of generated and stored power necessary to drive each electric engine that it mounts.

57. An aircraft according to claim 52, wherein:

said aircraft has a maximum length associated with it measured along a direction of travel;

the wingspan is at least three times the maximum length;

the structural member is a main spar that extends substantially across the entire wingspan; and the photovoltaic array covers at least forty percent of the upward surface of the wing, the photovoltaic array overlying the main spar substantially across the entire wingspan.

58. An aircraft having a length dimension parallel to a direction of travel and a wingspan dimension substantially perpendicular to a forward direction of travel, the aircraft being substantially free of a fuselage along the length dimension, comprising:

a substantially un-swept wing that extends along the wingspan dimension;

a plurality of aircraft engines that overhang the wing, in front of it along the forward direction of travel; and a plurality of fins that extend vertically downward from the wing at locations distributed along the wingspan, the fins each having a vertical length that is at least fifty percent of a length of the aircraft, wherein the aircraft further comprises a landing gear that includes two wheels mounted at the base of each fin, away from the wing along the vertical direction, the landing gear having a main gear and a front-most gear; and wherein the wheels at each fin are separated along the direction of travel and are oriented with respect to one another and the wing's angle of attack such that the main gear lifts off prior to the front-most gear during take-off.

59. An aircraft according to claim 58, wherein:

the aircraft has a maximum length; and the wingspan is at least four times the maximum length of the aircraft.

60. An aircraft according to claim 58, wherein the wing is configured to include dihedral during flight for providing roll stability.

61. An aircraft according to claim 58, having a center of gravity, wherein:

the aircraft includes at least two substantially horizontal elevator flaps, but is free of a rudder and free of ailerons;

the aircraft includes a controller that turns the aircraft in yaw by causing differential thrust to be applied to the engines, free of using ailerons or a rudder the wing defines an aerodynamic center that lies behind the center of gravity to create a nose-down pitching moment; and the aircraft is free of a tail structure.

62. An aircraft according to claim 58, wherein said aircraft is free of a rudder.

63. An aircraft according to claim 58, wherein:

there are at least two fins that are spaced along the wingspan of the aircraft; and said aircraft has a weight associated with it, no more than fifty percent of the weight of the aircraft being distributed within any twenty percent portion of the wingspan.

\* \* \* \* \*

UNITED STATES PATENT AND TRADEMARK OFFICE
CERTIFICATE OF CORRECTION

| | |
|---|---|
| PATENT NO. | : 5,810,284 |
| APPLICATION NO. | : 08/404540 |
| DATED | : September 22, 1998 |
| INVENTOR(S) | : Hibbs et al. |

It is certified that error appears in the above-identified patent and that said Letters Patent is hereby corrected as shown below:

On Title page, please insert the name of the Assignee as -- AeroVironment Inc., Monrovia, CA --.

Signed and Sealed this

Second Day of September, 2008

JON W. DUDAS
*Director of the United States Patent and Trademark Office*